(12) United States Patent
Tsuda et al.

(10) Patent No.: US 7,269,305 B2
(45) Date of Patent: Sep. 11, 2007

(54) OPTICAL SWITCH

(75) Inventors: Hiroyuki Tsuda, Yokohama (JP); Toshiharu Saiki, Yokohama (JP)

(73) Assignee: Keio University, Minato-ku, Tokyo (JP)

( * ) Notice: Subject to any disclaimer, the term of this patent is extended or adjusted under 35 U.S.C. 154(b) by 0 days.

(21) Appl. No.: 11/313,655

(22) Filed: Dec. 22, 2005

(65) Prior Publication Data

US 2006/0140535 A1 Jun. 29, 2006

(30) Foreign Application Priority Data

Dec. 27, 2004 (JP) .............................. 2004-375180

(51) Int. Cl.
*G02B 6/26* (2006.01)
(52) U.S. Cl. ................... 385/4; 385/3; 385/16
(58) Field of Classification Search ................ None
See application file for complete search history.

(56) References Cited

U.S. PATENT DOCUMENTS

| | | | |
|---|---|---|---|
| 6,844,042 B1 * | 1/2005 | Ma et al. ............... | 428/64.1 |
| 2001/0014061 A1 * | 8/2001 | Ueyanagi ............. | 369/44.23 |
| 2002/0181822 A1 * | 12/2002 | Doerr et al. ........... | 385/3 |
| 2004/0096144 A1 * | 5/2004 | Ramalingam et al. ... | 385/16 |

FOREIGN PATENT DOCUMENTS

| | | |
|---|---|---|
| JP | 62-295005 | 12/1987 |
| JP | 4-304414 | 10/1992 |

OTHER PUBLICATIONS

F. Ebisawa, et al.; "Self-Holding Optical Switch using a silica-based optical integrated Mach-Zehnder interferometer with a Photochromic Cladding Poymer," *The Institute of Electronics, Information and Communication Engineers, Technical Report of IEICE*; vol. 96; No. 284; OME96-64; Oct. 1996; pp. 31-36./ Discussed in the specification.

* cited by examiner

*Primary Examiner*—Tina M Wong
(74) *Attorney, Agent, or Firm*—Edwards Angell Palmer & Dodge LLP

(57) ABSTRACT

In order to provide a low-loss optical switch that is low in power consumption by providing the same as a self-holding type, and high speed and highly practicable, an optical switch of the present invention is composed of a quartz substrate (101), first and second input waveguides (102a and 102b), a first directional coupler (103), first and second arm waveguides (104a and 104b) of a Mach-Zehnder interferometric circuit, a second directional coupler (105), first and second output waveguides (106a and 106b), and a phase change material portion (100). A control light (for an amorphous to crystal transition) pulse (pulse width: 20 ns, pulse intensity: 5 mW) having a wavelength of 0.78 microns is irradiated. As a result of the control light pulse irradiation, the phase change material portion (109) changes in phase to a crystal state, and the optical switch transits to a bar condition.

7 Claims, 28 Drawing Sheets

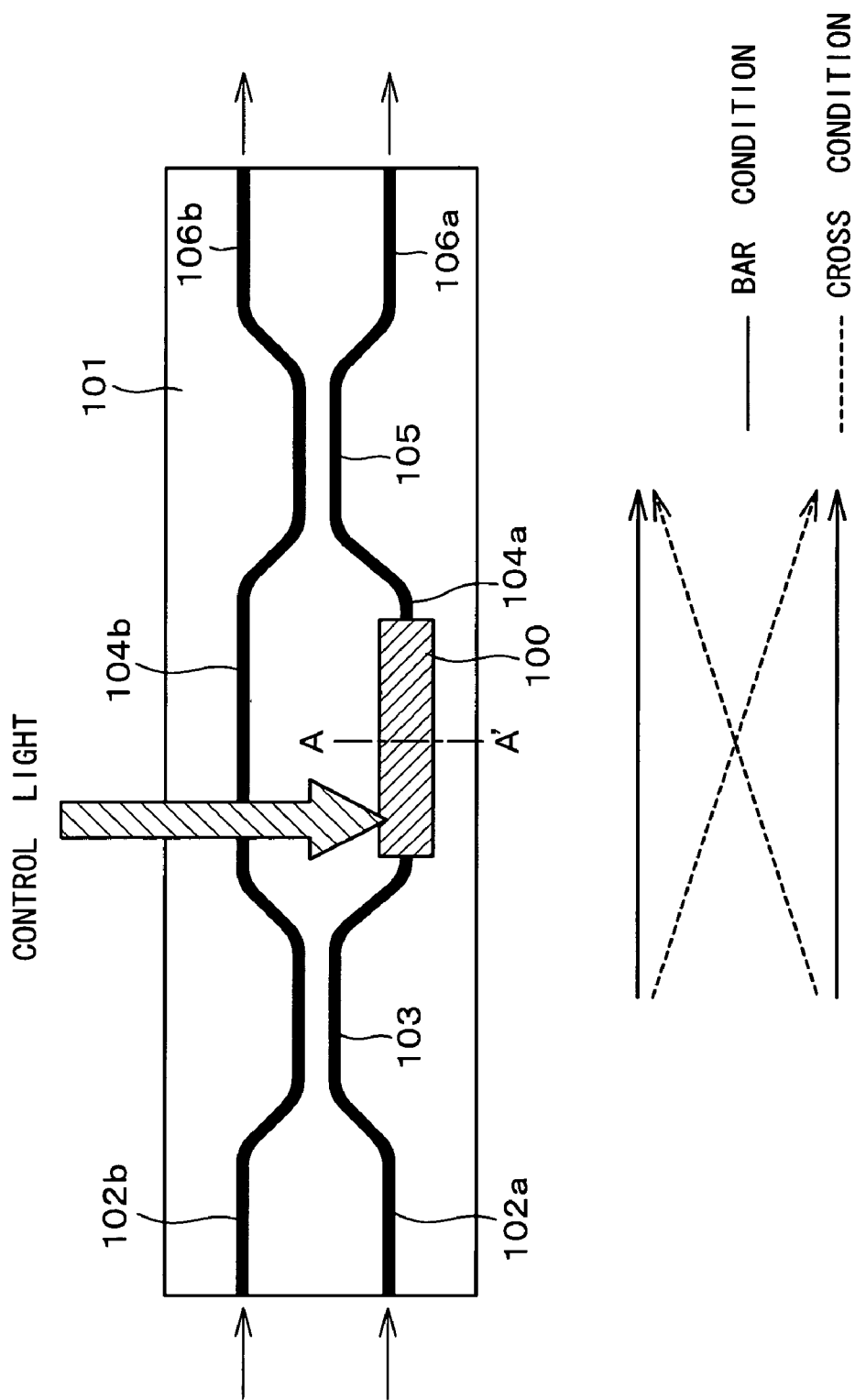

F I G. 1 I
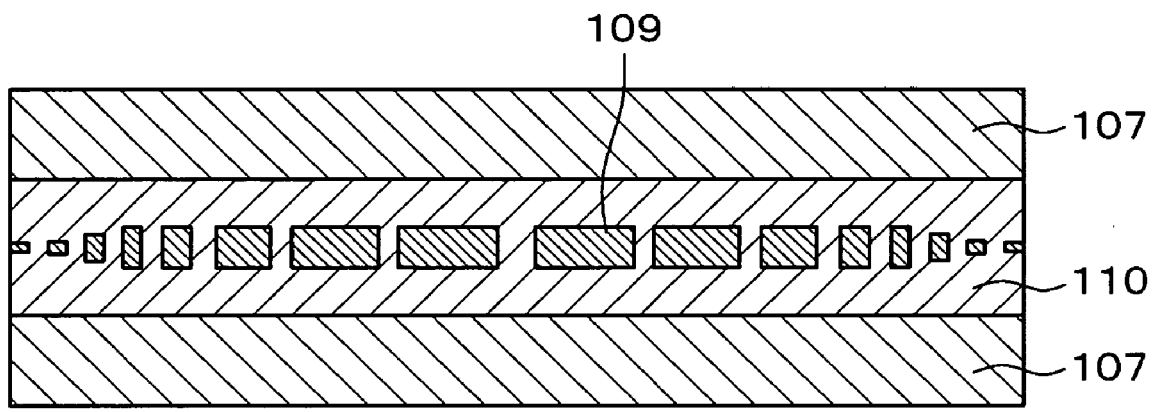

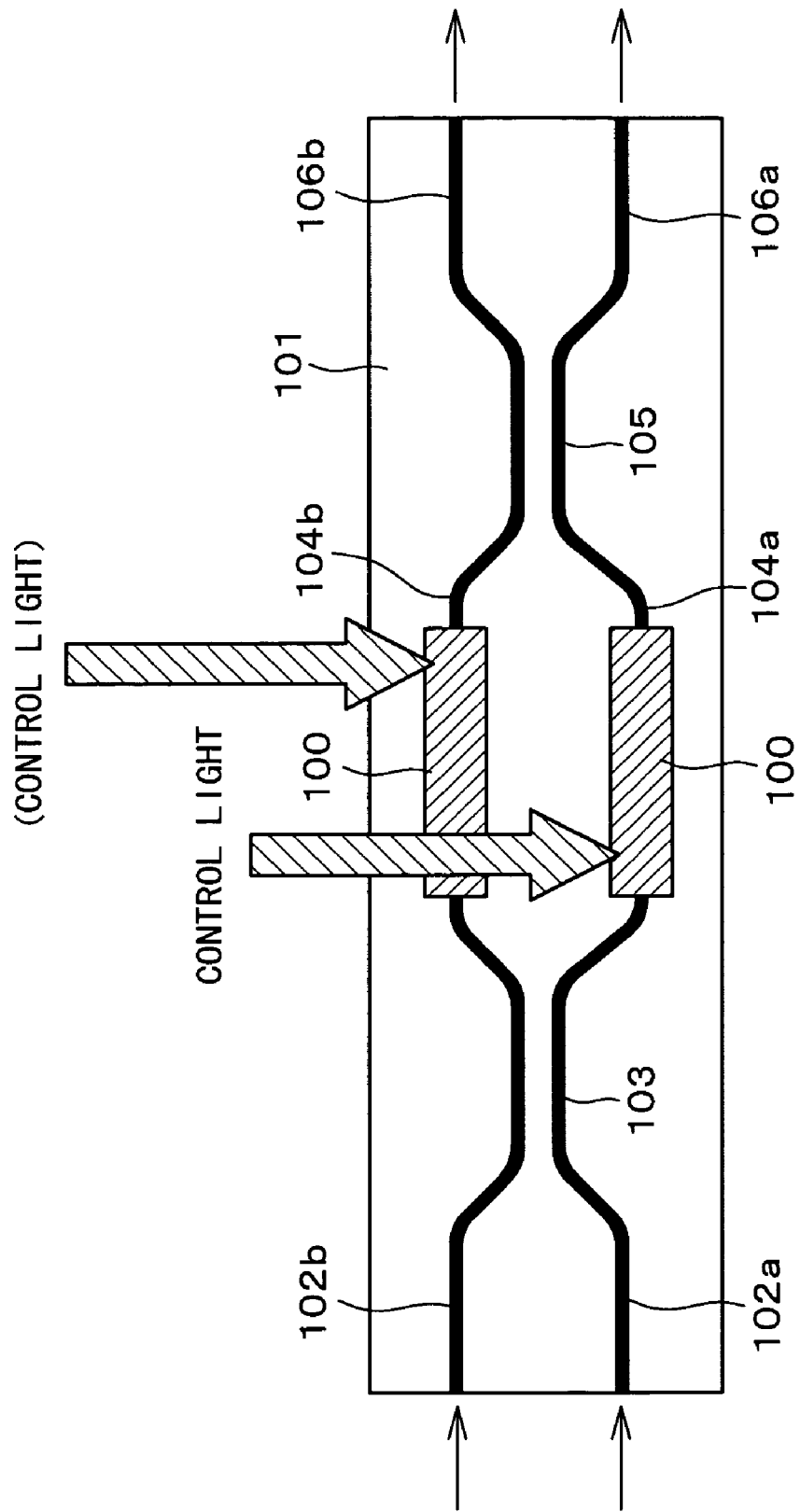

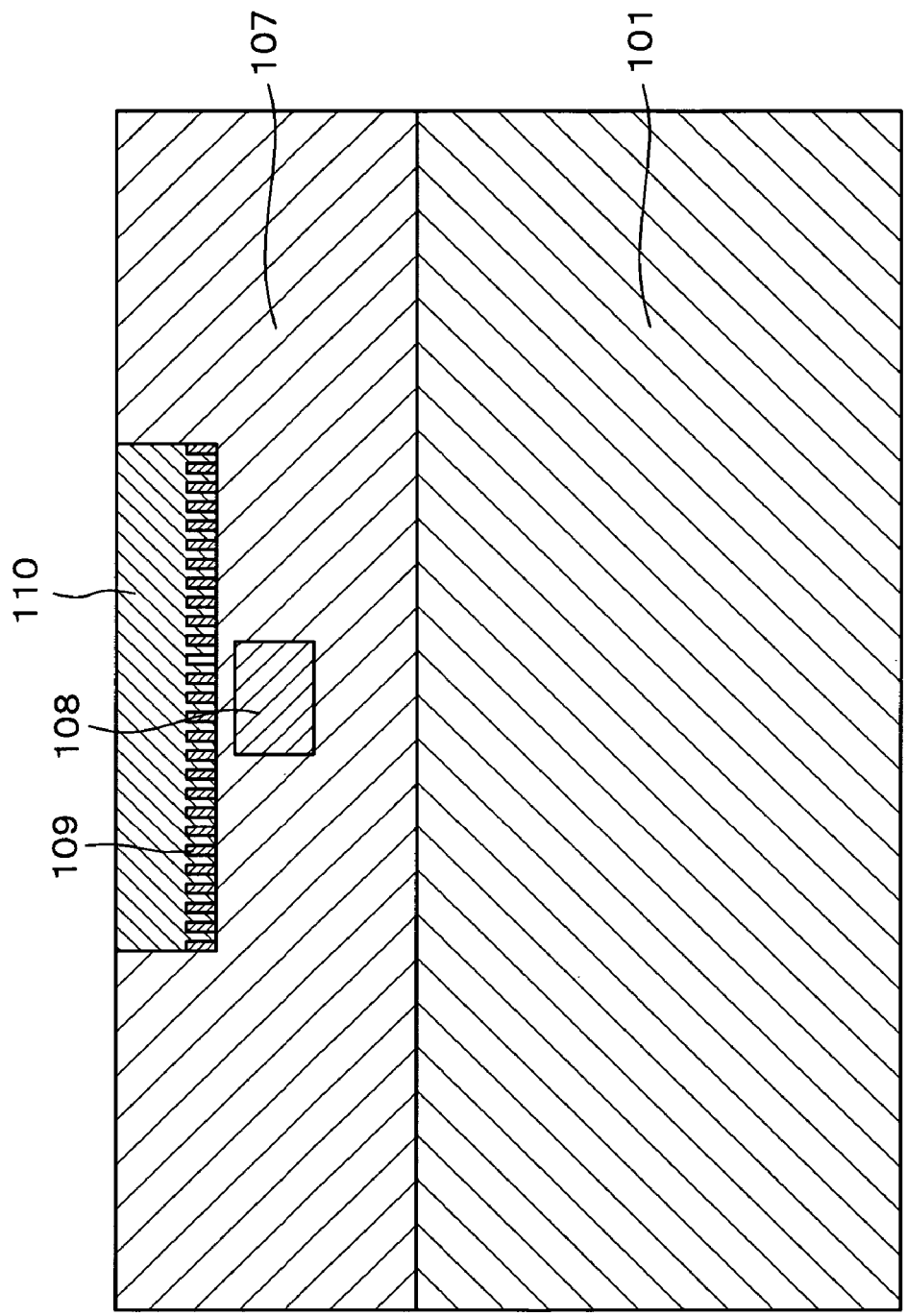

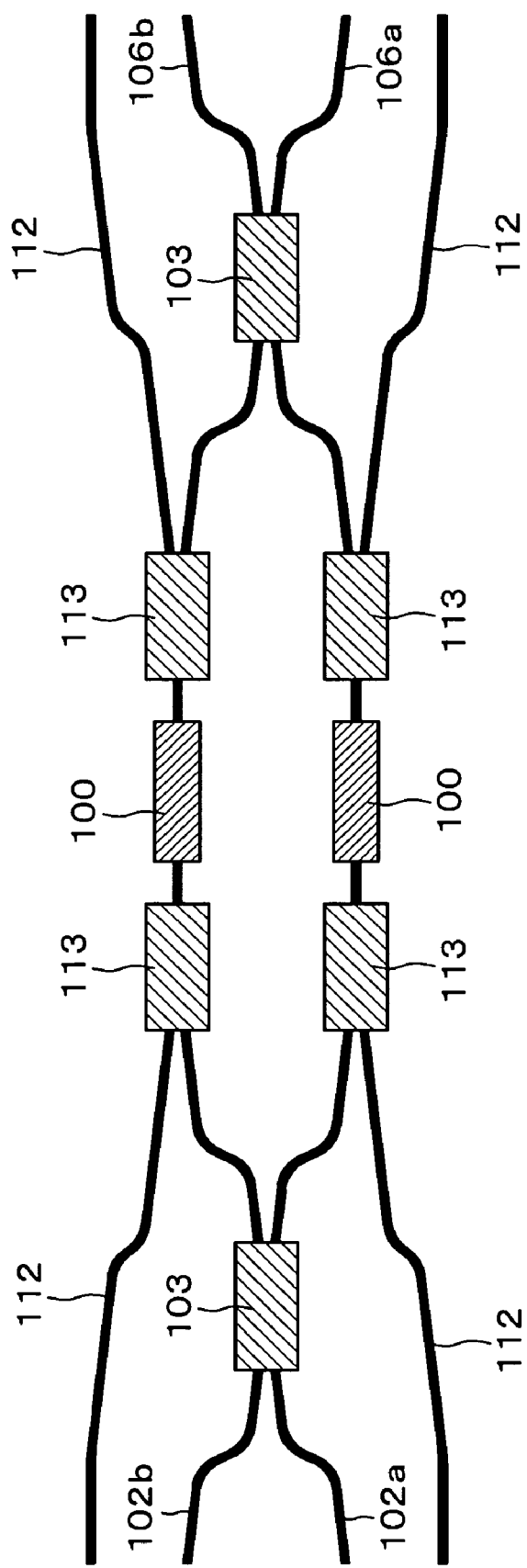

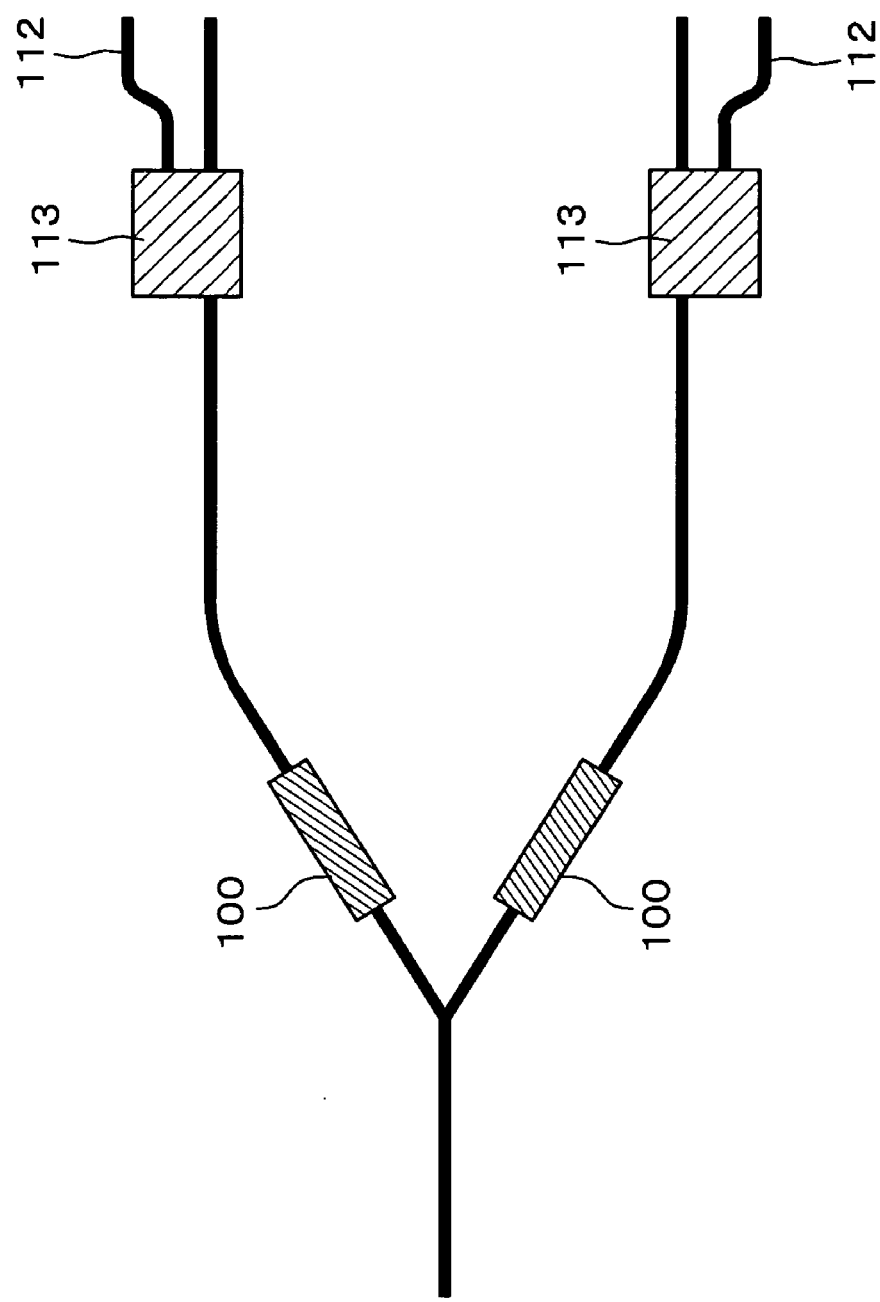

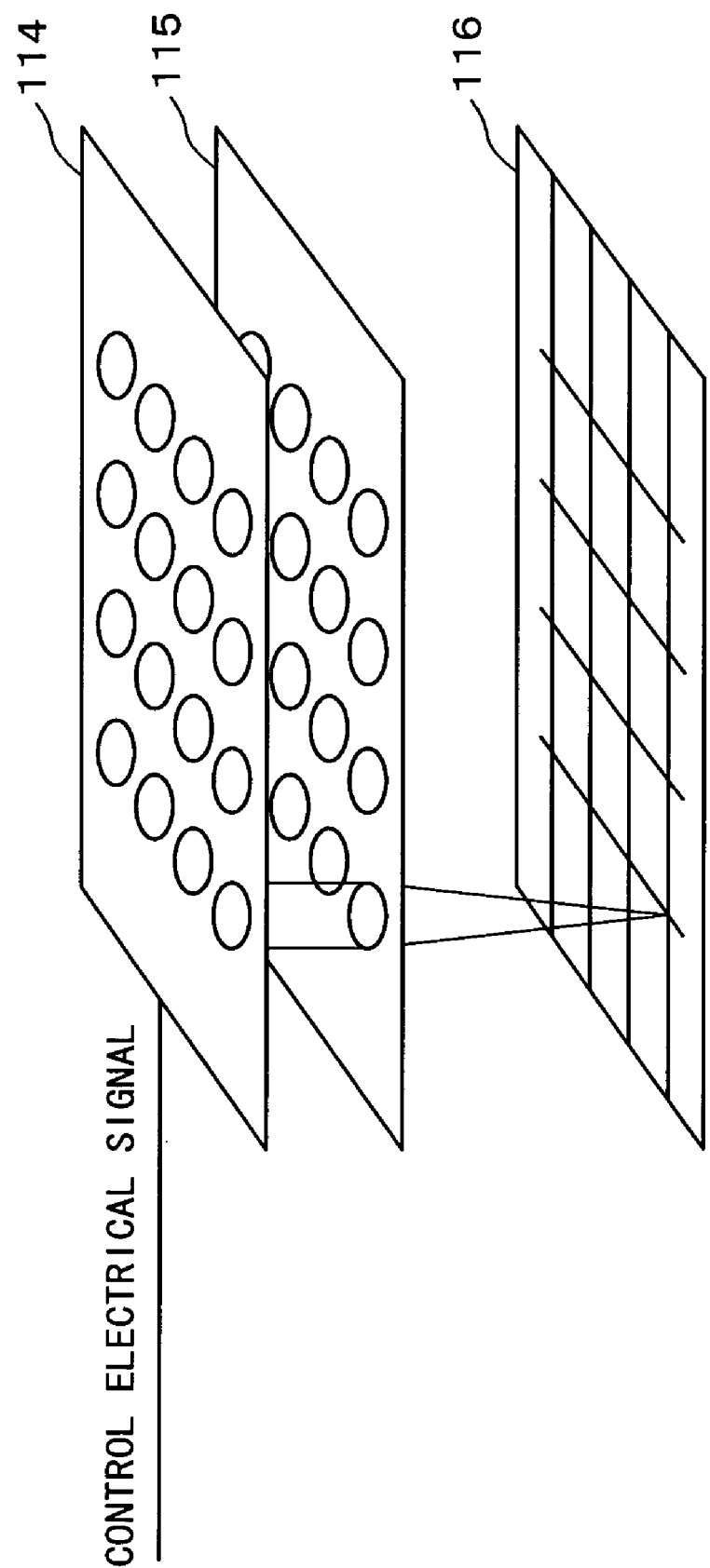

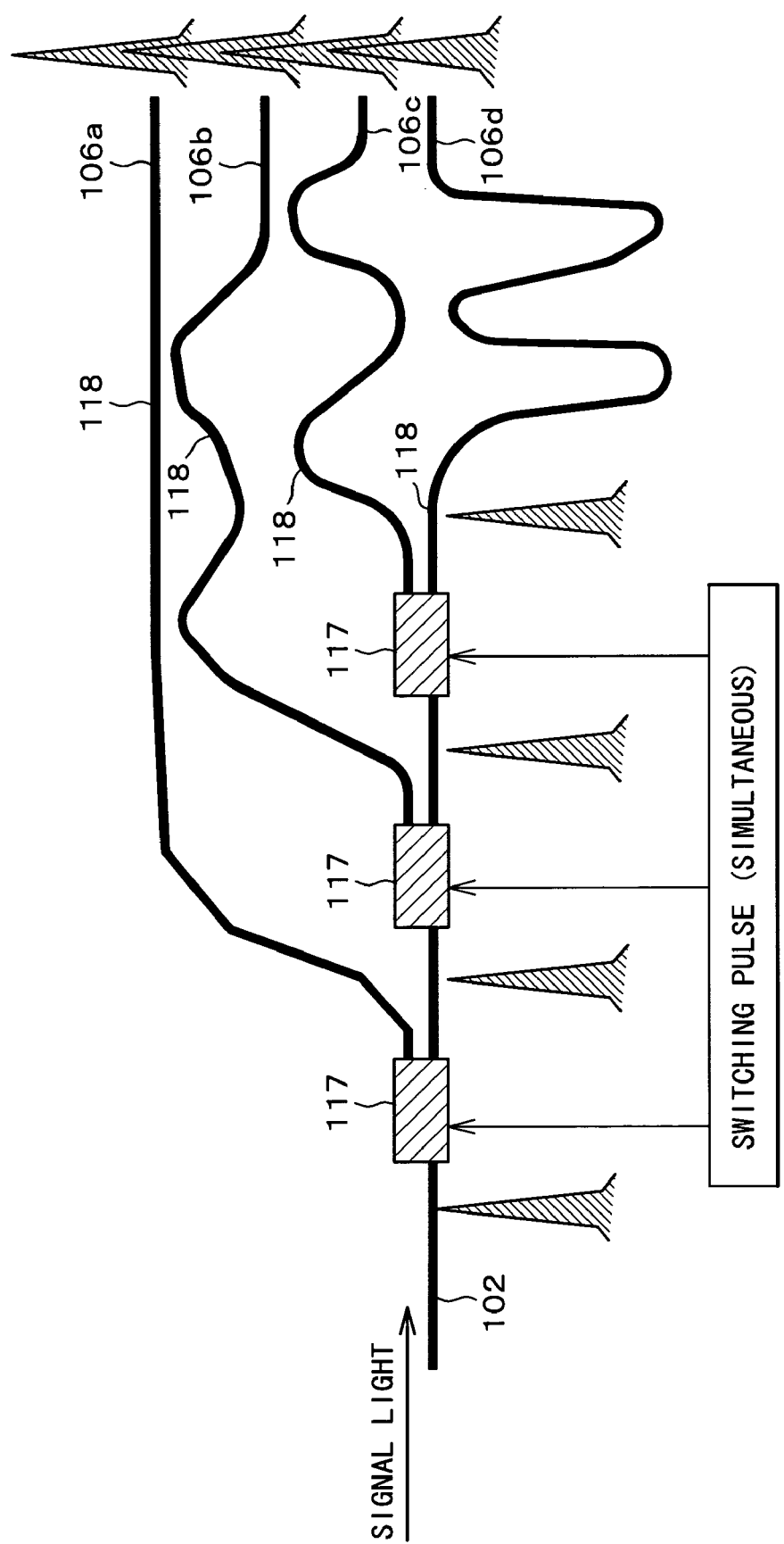

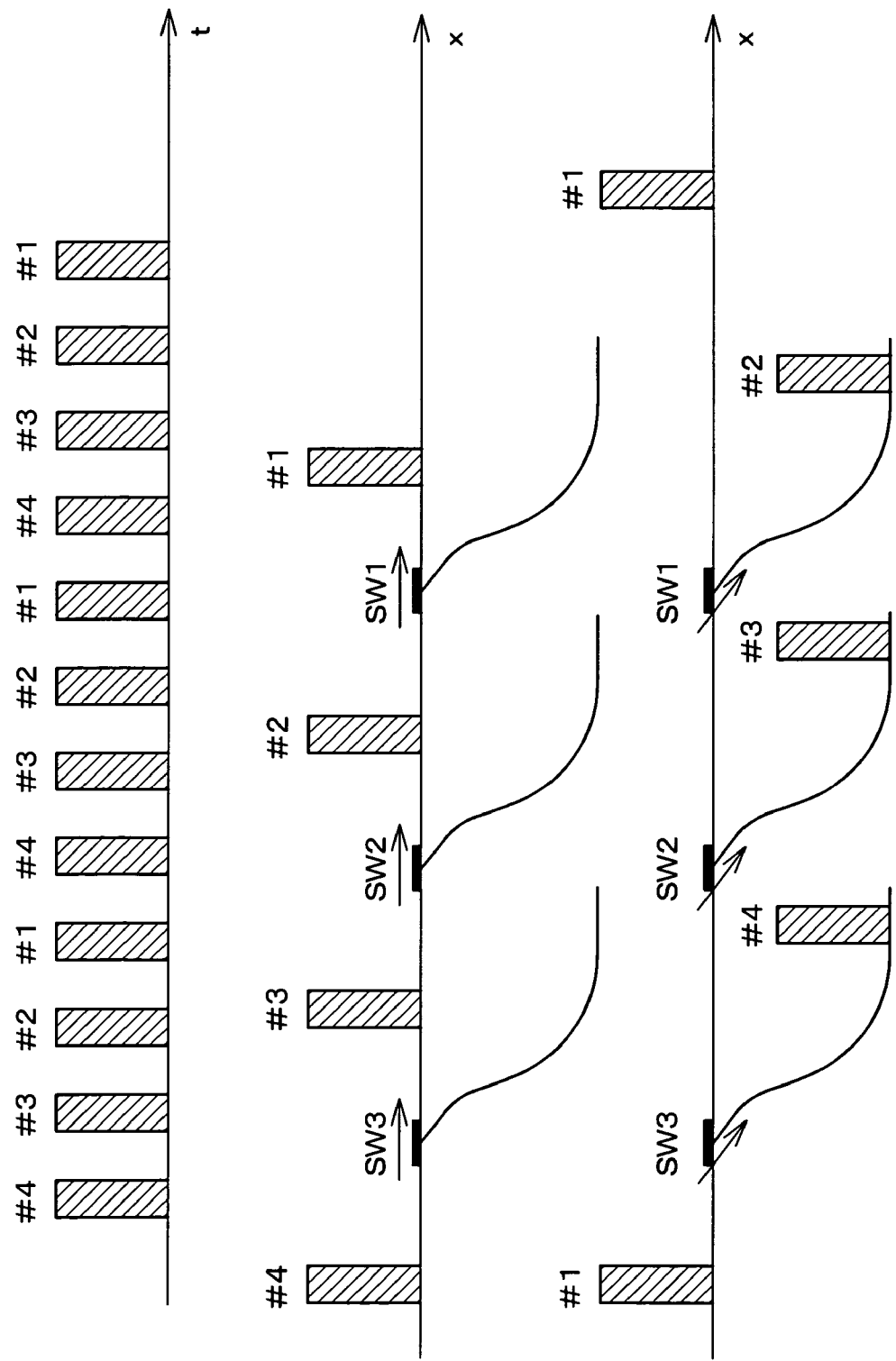

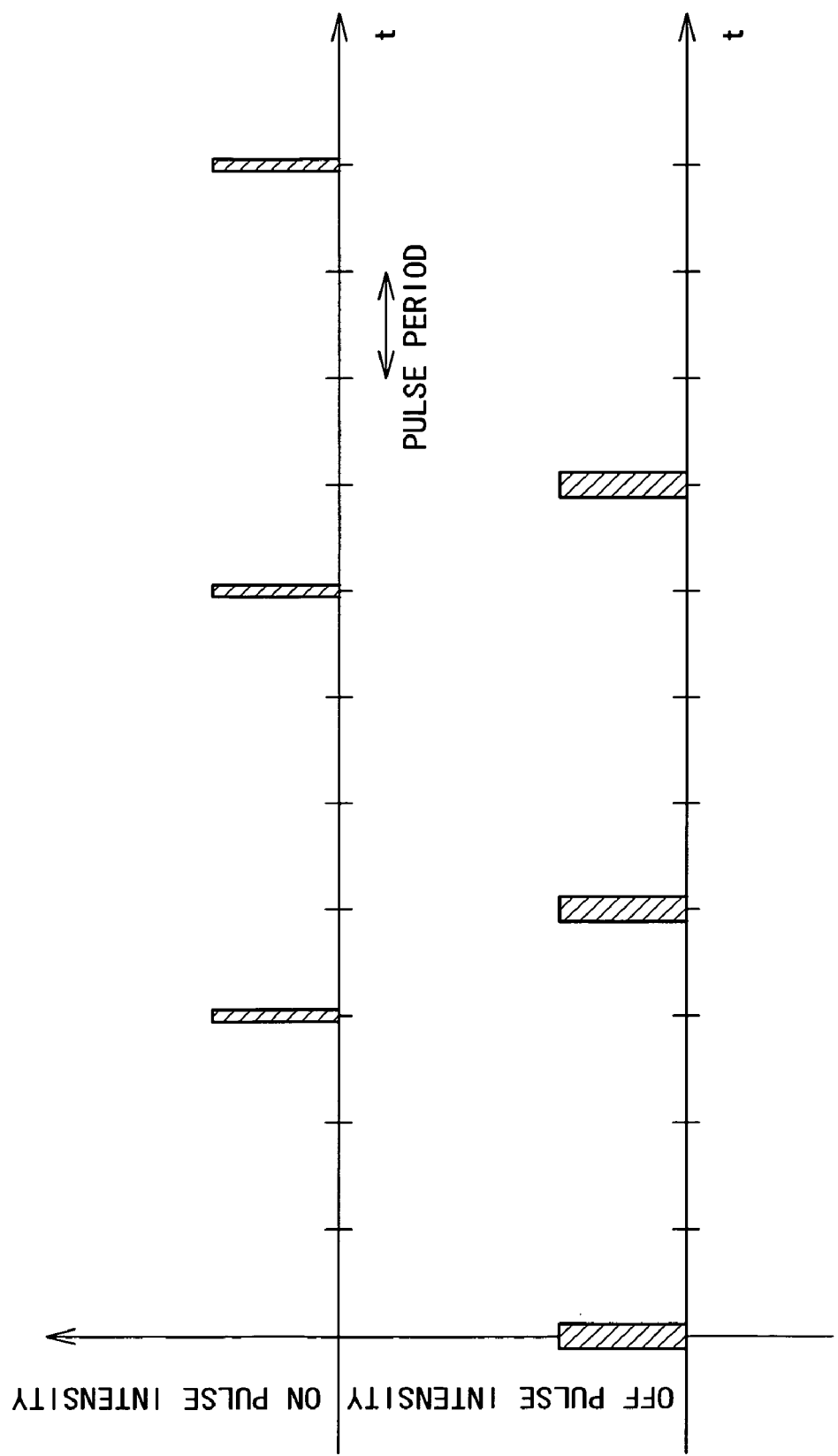

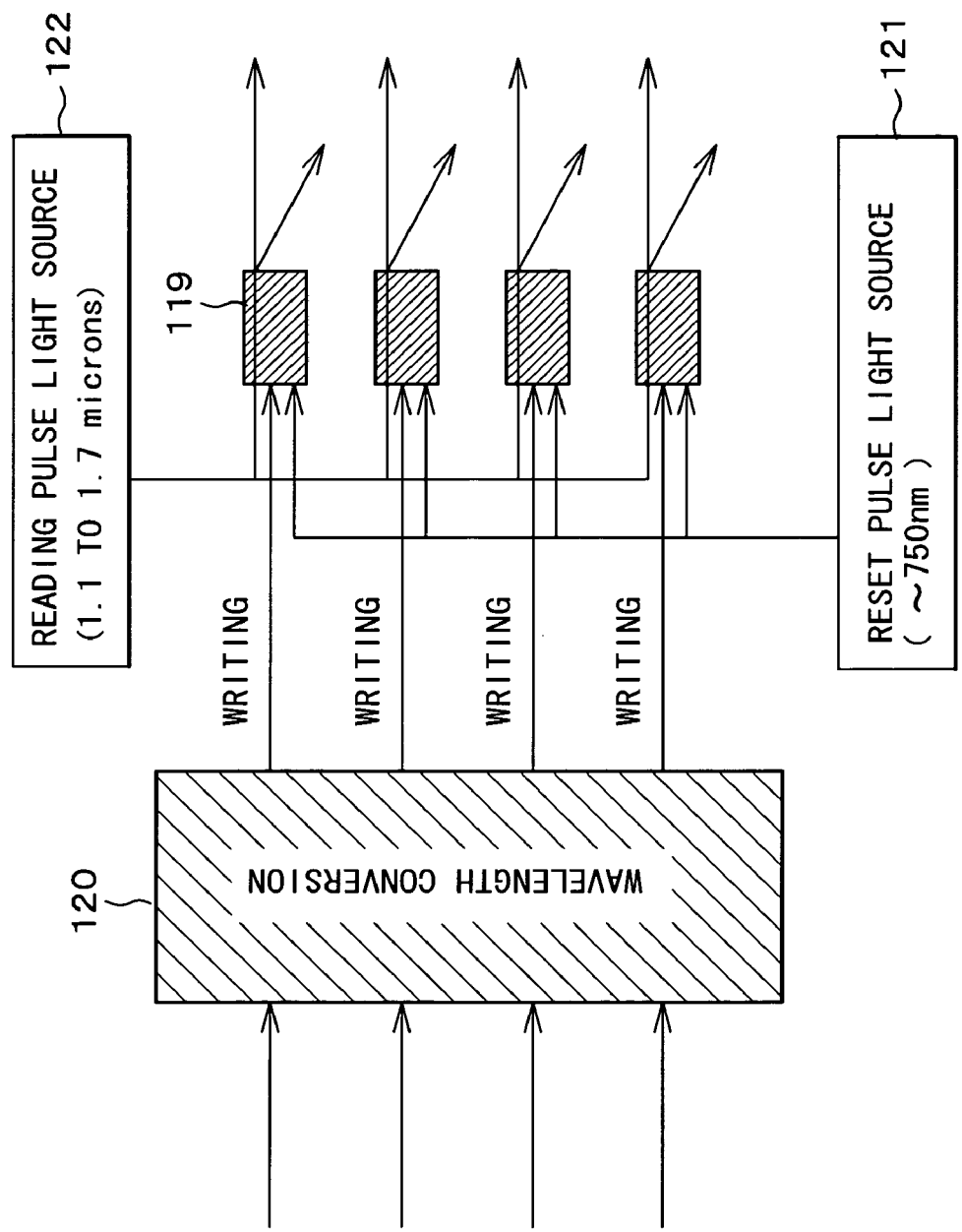

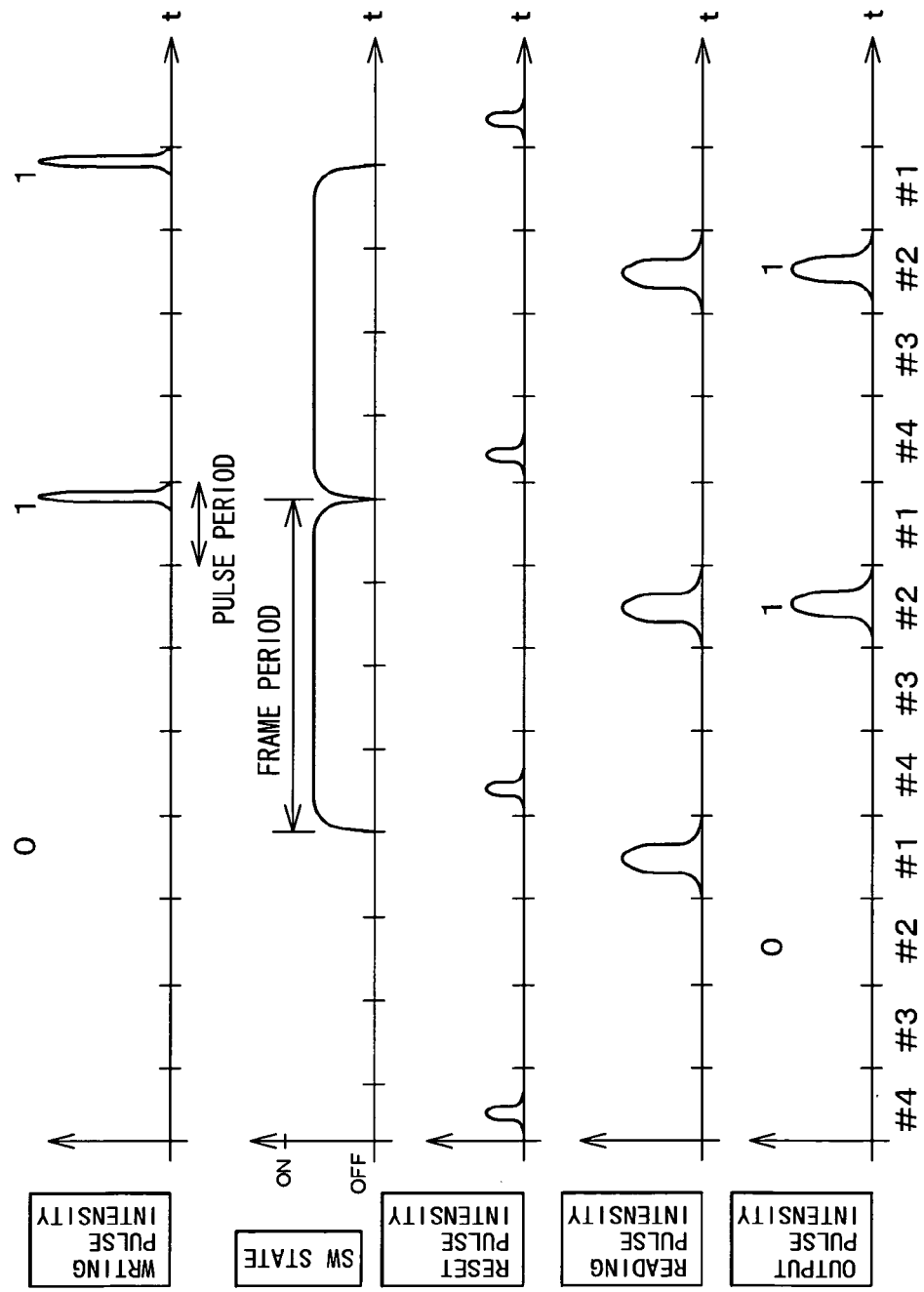

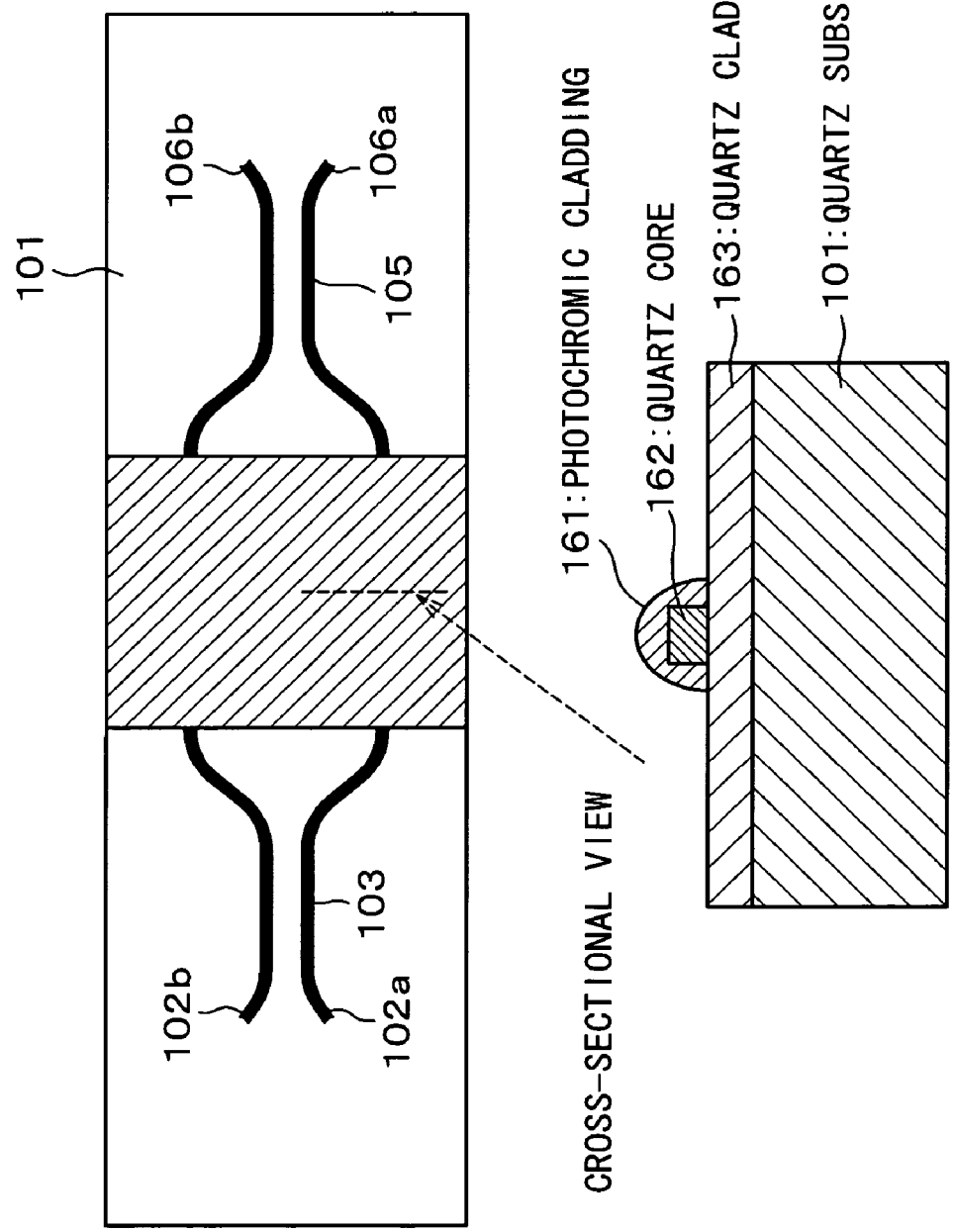

OPTICAL SWITCH

BACKGROUND OF THE INVENTION

1. Field of the Invention

The present invention relates to an optical switch that is effective for application to a switching process circuit of an optical communications network node.

2. Description of the Related Art

FIG. 10a is a view showing a configuration and operation mechanism of a conventional optical switch. This conventional optical switch is composed of input waveguides 102, a 2×2 first directional coupler 103, two single-mode waveguides 104a, 104b, a 2×2 second directional coupler 105, and output waveguides 106. The material is quartz. One of the two single-mode waveguides 104b is provided with a heater electrode 150 for controlling temperature. When an electric current is supplied to the heater electrode 150 to change the temperature, the refractive index of the single-mode waveguide 104b in the vicinity of the heater electrode 150 is changed. Therefore, a phase difference in light waves occurs between the single-mode waveguides 104a, 104b, whereby the ratios of coupling in the two output waveguides 106 are changed. If proper drive conditions are selected, it is possible to switch a light path by turning on/off an electric current that flows to the heater electrode 150.

Moreover, there are also optical switches that are composed of lithium niobate waveguides, PLZT waveguides, or semiconductor waveguides and that carry out switching by changing refractive indices of these waveguides by changing the voltage to be applied to these. However, because these optical switches have no self-holding function, it is necessary to supply current at all times or to apply voltage at all times so as to maintain switch states. Therefore, these optical switches have a drawback in high power consumption.

FIG. 10b is a view showing a configuration of a conventional optical switch having a self-holding function using a photochromic material. This conventional optical switch has a structure wherein a quartz cladding 163 is formed on a quartz substrate 101, further thereon a quartz core 162 is formed, and as a cladding to cover the quartz core 162, a photochromic cladding 161 is partially applied, and a self-holding optical switch is realized owing to the photochromic material. The photochromic material is a material that changes from state 1 to state 2 when this is irradiated with a first-wavelength light and changes from state 2 to state 1 when this is irradiated with a second-wavelength light. Because both states are metastable, the refractive index changes as a result of these changes in state. Therefore, the photochromic material can be used for waveguides to construct a self-holding optical switch (see Non-Patent Document 1). However, there is a drawback in that the switching speed is slow (several seconds or more) since a change in molecular orientation is involved and in that light having two different wavelengths is necessary for switching.

In addition, there is also an optical switch wherein a chalcogenide film is formed on an optical waveguide film (see Patent Document 1, for example). Generally, a chalcogenide material has a refractive index of approximately 3.5 to 4.0 and is one of the materials having the largest refractive indices. Therefore, when the optical waveguide is not a material having a similarly large refractive index such as a semiconductor or another chalcogenide material, propagating light is mostly converged into the chalcogenide film. For example, the refractive indexes of quartz glass and a polymer that are representative optical waveguide materials at a wavelength of 1.55 microns as being an optical communications wavelength range are 1.45 to 1.70, and the refractive index of lithium niobate is 2.2. Therefore, a propagation loss resulting from a convergence of a propagation light into the chalcogenide film and a loss resulting from a mismatch in mode field shapes between parts with and without the chalcogenide film are unavoidable.

In addition, there is also an optical switch wherein grooves are formed within an optical waveguide and a chalcogenide film is formed on this groove portion (see Patent Document 2, for example). In this case, when an optical waveguide part that is not a chalcogenide film is not comparable in the refractive index to chalcogenide, a reflection resulting from a mismatch in refractive indices occurs, and optical circuit characteristics are deteriorated. Therefore, a combination of quartz glass, a polymer, or an oxide material such as lithium niobate with an optical waveguide cannot construct a high-performance optical circuit.

Patent Document 1: Japanese Unexamined Patent Application Publication No. S62-295005

Patent Document 2: Japanese Unexamined Patent Application Publication No. H04-304414

Non-patent Document 1: Ebisawa et al., "Self-holding photochromic polymer Mach-Zehnder optical switch," Technical Report of IEICE, October 1996, Vol. 96, No. 284, OME96-64, p. 31-36

SUMMARY OF THE INVENTION

Problem to be Solved by the Invention

As such, when conventional optical switches are provided as self-holding types that are low in power consumption, because high speed characteristics are inferior and a propagation loss of light is great, these have been lacking in practicability.

In view of the problems, it is an object of the present invention to provide a low-loss optical switch that is low in power consumption by providing the same as a self-holding type, and is high speed and highly practicable.

An optical switch of the present invention comprises: a substrate; a cladding formed on the substrate; a core formed in the cladding, forming a waveguide with the cladding; and a phase change material portion formed in the cladding along the core, having an optical thickness equal to or less than ½ of an operating wavelength, for changing the refractive index of the waveguide by the phase state being controlled by a light irradiation, a voltage application, or an electric current injection.

In addition, it is desirable that the phase change material portion includes: a tetrahedral material; a Ge—Sb—Te-based chalcogenide material; a Sb—Te-based chalcogenide material; or a chalcogenide material such as $As_2Se_3$ or $As_2S_3$.

In addition, a phase change material of the phase change material portion is composed of grains having a diameter of 10 nm to 200 nm or thin lines having a 10 nm to 200 nm width, whereby phase transition time can be reduced to construct a high-speed switch.

In addition, it is preferable that an optical switch configuration is any of: a Mach-Zehnder type where a first input waveguide, a first coupler, two single-mode arm waveguides, a second directional coupler, and an output waveguide are connected in this order, and the phase change material portion is provided on one or both of the single-mode arm waveguides; a Mach-Zehnder type where a first input waveguide, a first multimode interference coupler, two single-mode arm waveguides, a second multimode interference coupler, and an output waveguide are connected in this order, and the phase change material portion is provided on one or both of the single-mode arm waveguides; a Y-branch type where a first input waveguide, Y-branch waveguides, and an output waveguide are connected in this order, and the phase change material portion is provided on one or both of the Y-branch waveguides; and a directional coupling type where a first input waveguide, a directional coupler, and an output waveguide are connected in this order, and the phase change material portion is provided on one or both of the directional couplers.

In addition, by comprising a second input waveguide and coupler for guiding an optical switch control light to the phase change material portion, since integration also including the control light guiding/irradiating portion is carried out, this is effective for providing the optical switch as a small-sized device.

In addition, by comprising a planar-laser array that emits an optical switch control light for controlling the phase change material portion arranged opposite the substrate, since a planar-laser array that allows to arrange light sources at a high density and is capable of generating a light pulse at high speed is utilized, it is possible to construct a large-scale optical switch.

In addition, by comprising a plurality of the 1-input-by-2-output optical switches connected in series, a waveguide that connects the adjacent optical switches and has a light propagation time equal to a clock frequency of a light signal, and delay waveguides provided as respective output waveguides from the optical switches, the light signal can be serial-parallel converted.

In addition, by comprising a plurality of the 1-input-by-2-output optical switches connected in parallel, a reading pulse light source for supplying each of the optical switches with a light pulse to read out each switch state, and a reset pulse light source for supplying each of the optical switches with a light pulse to reset each switch state, a parallel bit variable delay/wavelength conversion circuit can be realized.

In addition, by comprising the optical serial-parallel converter, the parallel bit variable delay/wavelength conversion circuit, and an optical parallel-serial converter for which input/output of the optical serial-parallel converter has been inverted for receiving an output light from the parallel bit variable delay/wavelength conversion circuit, an optical time switch can be realized.

In addition, an optical switch comprises: a photonic crystal waveguide; and a phase change material portion formed along a light path of the photonic crystal waveguide, having an optical thickness equal to or less than ½ of an operating wavelength, for changing the refractive index of the waveguide by the phase state being controlled by a light irradiation, a voltage application, or an electric current injection.

Effects obtained out of representative examples of the present invention are briefly described as follows.

Because the optical switch uses a phase change material with memory feature, an optical switch that is capable of a self-holding operation without the necessity for maintaining a power distribution and a light irradiation and is low in power consumption can be constructed. By utilizing the memory feature, optical information can be recorded corresponding to a switch state, which makes it possible to read out recorded optical information according to an output position of a reading light. An optical memory of an all-optical type that performs input/output and control by use of light can be constructed, which makes it possible to simultaneously realize a variable delay function (function to vary delay time necessary for passing through the present optical switch), a time switch function (function to switch timeslots of light pulses that carry information), and a wavelength conversion function (function to differentiate an output light wavelength from an input light wavelength).

In addition, the phase change material such as chalcogenide changes from crystal to an amorphous state in less than a nanosecond, and a change from an amorphous state to crystal is also carried out in a few tens of nanoseconds. Therefore, switching is possible at a higher speed than that of the conventional switch of a thermal-effect type or using a photochromic material. In addition, unlike the photochromic material, since the phase change material has a feature that allows switching between different states by a single-wavelength light, switching is possible by controlling the pulse width and intensity of a pulse light from a single light source. Furthermore, when a high-intensity light is used, it is also possible, by multiphoton absorption, a light in a transparent wavelength range used as a signal light to be controlled is used as a control light too. In addition, integrating waveguides to irradiate a control light onto phase change material portions can also allow size reduction. In addition, usage of a planar-laser array as a control light source also makes it possible to drive a large-scale optical switch for which a large number of optical switches have been integrated at a high density.

The specification includes the contents described in the specification and/or drawings of Japanese Patent Application No. 2004-375180 as a basis for which this application claims priority.

BRIEF DESCRIPTION OF THE DRAWINGS

FIG. 1A is a top view showing a configuration of an optical switch according to Embodiment 1 of the present invention;

FIG. 1I is a top view showing a configuration of an optical switch according to Embodiment 1 of the present invention;

FIG. 2A is a top view showing a configuration of an optical switch according to Embodiment 2 of the present invention;

FIG. 3 is a sectional view showing a configuration of an optical switch according to Embodiment 3 of the present invention;

FIG. 4A is a top view showing a configuration of an optical switch according to Embodiment 4 of the present invention;

FIG. 4B is a top view showing a configuration of an optical switch according to Embodiment 4 of the present invention;

FIG. 5 is a perspective view showing a configuration of an optical switch according to Embodiment 5 of the present invention;

FIG. 6A is a view showing a configuration of an optical switch according to Embodiment 6 of the present invention;

FIG. 6B is a view showing an operation of an optical switch according to Embodiment 6 of the present invention;

FIG. 6C is a view showing an operation of an optical switch according to Embodiment 6 of the present invention;

FIG. 7A is a view showing a configuration of an optical switch according to Embodiment 7 of the present invention;

FIG. 7B is a view showing an operation of an optical switch according to Embodiment 7 of the present invention;

FIG. 10B is a view showing a configuration of a conventional optical switch having a self-holding function using a photochromic material.

DETAILED DESCRIPTION OF THE INVENTION

Hereinafter, preferred embodiments for carrying out the present invention will be described in detail with reference to the accompanying drawings. In the entire drawings for describing embodiments, identical reference signs will be used for components having identical functions, and overlapping description thereof will be omitted.

Embodiment 1

Figure 1B:
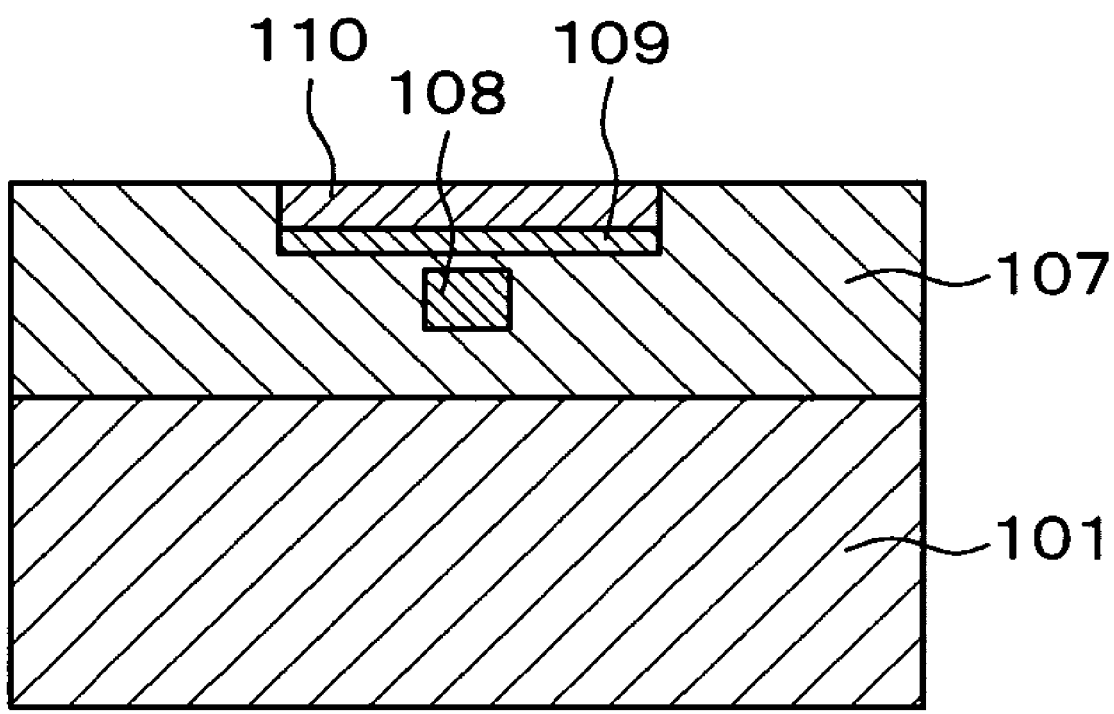
FIG. 1B is a sectional view showing a configuration of an optical switch according to Embodiment 1 of the present invention.

FIG. 1A to FIG. 1J are views showing configurations of an optical switch according to Embodiment 1 of the present invention. FIG. 1A is a top view thereof. The optical switch of Embodiment 1 is composed of a quartz substrate 101, first and second input waveguides 102a and 102b, a first directional coupler 103, first and second arm waveguides 104a and 104b of a Mach-Zehnder interferometric circuit, a second directional coupler 105, first and second output waveguides 106a and 106b, and a phase change material portion 100 as a region. Details of this phase change material portion 100 as a region are shown in the following.

FIG. 1B is a sectional view along A-A' of FIG. 1A. An optical switch according to Embodiment 1 in this section is composed of a quartz substrate 101, a cladding 107, a core 108, a phase change material portion 109, and a sealing resin 110. The sealing resin 110 has a refractive index equivalent to that of the cladding 107, seals the phase change material portion 109 in the cladding 107 and also functions as a part of the cladding, and as a matter of course, a non-resin material such as quartz glass can be utilized. The thickness of the phase change material portion 109 is set to an operating wavelength/(2×refractive index) or less so that there is no guided mode that is propagated in the layer of the phase change material portion 109 alone. As a phase change material, a tetrahedral material such as amorphous silicon, amorphous germanium, amorphous gallium antimonide, amorphous gallium arsenide, amorphous indium selenide, amorphous gallium selenide, a Ge—Sb—Te-based chalcogenide material such as $Ge_2Sb_2Te_5$ or $Ge_6Sb_2Te_9$, a Sb—Te-based chalcogenide material, or a chalcogenide material such as $As_2Se_3$ or $As_2S_3$ is preferable.

The first and second directional couplers 103 and 105 have a branching ratio of 1:1. It is assumed that the phase change material portion 109 is in an amorphous state and the first arm waveguide 104a and second arm waveguide 104b are equal in optical length at an input light wavelength (1.55 microns). At this time, the optical switch is in a cross condition where a light inputted in the first input waveguide 102a is outputted from the second output waveguide 106b, and a light inputted into the second input waveguide 102b is outputted from the first output waveguide 106a. At this time, a control light (for an amorphous to crystal transition) pulse (pulse width: 20 ns, pulse intensity: 5 mW) having a wavelength of 0.78 microns is irradiated. The amount of change in refractive index corresponding to a state transition of the phase change material is great and this is approximately 0.1. Therefore, although depending on a distance between the core 108 and phase change material portion 109, in order to provide a phase change in the first arm waveguide 104a as π, the length in the waveguide direction (or irradiation region) of the phase change material portion 109 is satisfactory at approximately 50 microns. As a result of the control light pulse irradiation, the phase change material portion 109 changes in phase to a crystal state, and the optical switch transits to a bar condition. As has been put into practical use with optical disk memories, the present material has a life in a crystal state in year units, and the bar condition of the optical switch can be maintained for a long time without a holding energy from the outside. In addition, by irradiating a control light (for a crystal to amorphous transition) pulse (pulse width: 1 ns, pulse intensity: 20 mW) having a wavelength of 0.78 microns, the phase change material portion 109 again changes to an amorphous state, and the switch transits to a cross condition. The optical switch operates as a reversible self-holding optical switch. It is possible to change the optimal value of an irradiation pulse width by selecting a material composition and a material base. In addition, a clear boundary between the amorphous and crystal states is different depending on the definition. For operating as an optical switch, it is sufficient as long as a sufficient change in the refractive index can be obtained, and a phase change between the amorphous and crystal states is not always necessary. As a matter of course, even with a change from an amorphous state to another amorphous state or a change between crystal states different in crystallinity, it is sufficient as long as a sufficient change in the refractive index can be obtained by regulating the pulse width and irradiation intensity of an irradiating light pulse. In addition, as a matter of course, even when a light in a long wavelength range (transparent wavelength range) with a small absorption coefficient is used, usage of a femotosecond/picosecond ultra-short pulse allows switching by use of multiphoton absorption.

Although FIG. 1C to FIG. 1G are also sectional views along A-A' of FIG. 1A, these are of other examples.

Figure 1C:
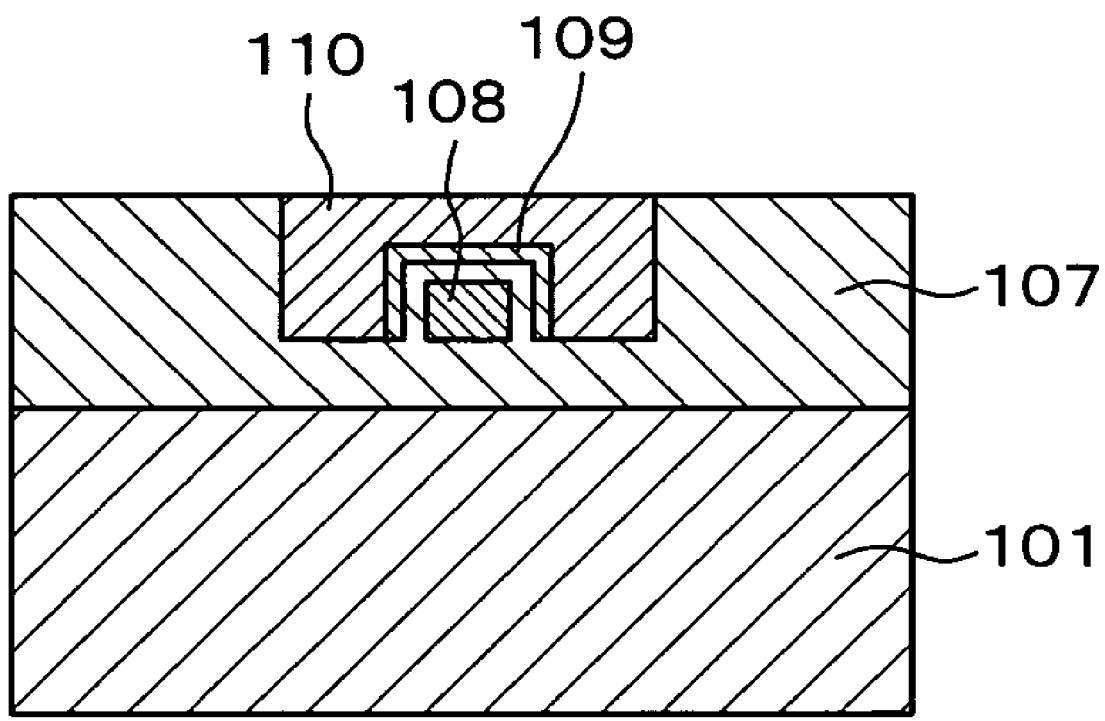
FIG. 1C is a sectional view showing a configuration of an optical switch according to Embodiment 1 of the present invention.

The configuration of FIG. 1C is a configuration where a phase change material is arranged in the vicinity of core sidewalls as well.

Figure 1D:
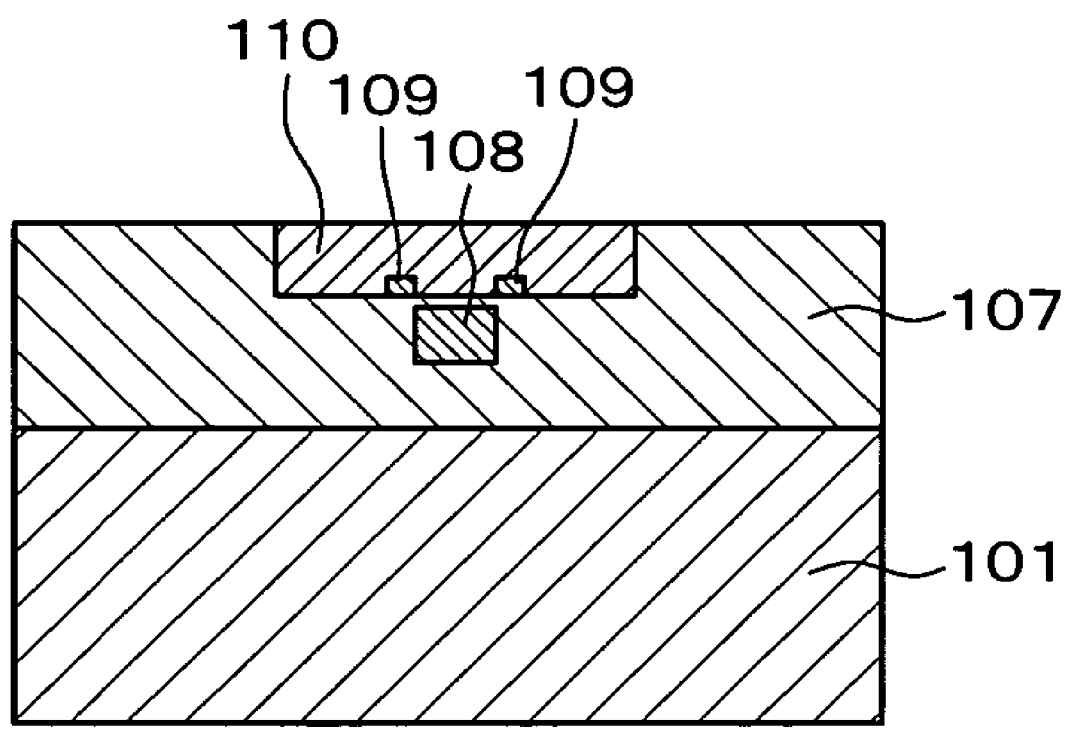
FIG. 1D is a sectional view showing a configuration of an optical switch according to Embodiment 1 of the present invention.

The configuration of FIG. 1D is a configuration where a phase change material is arranged separately at two positions obliquely above the core.

Figure 1E:
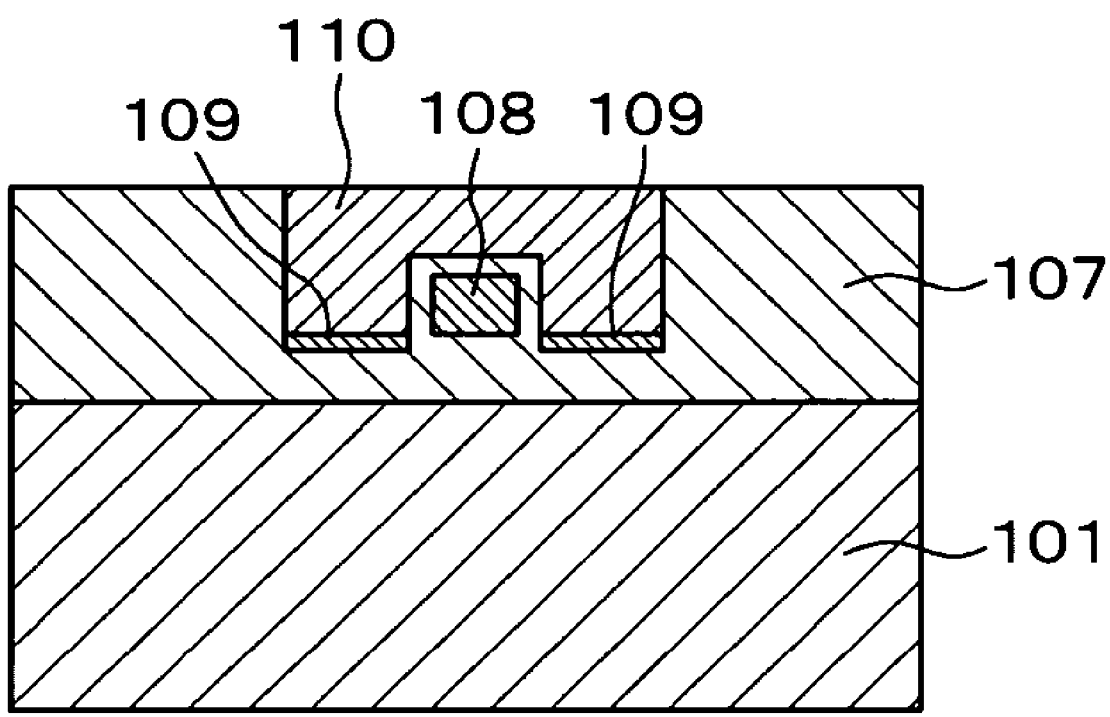
FIG. 1E is a sectional view showing a configuration of an optical switch according to Embodiment 1 of the present invention.

The configuration of FIG. 1E is a configuration where a phase change material is arranged separately at two positions obliquely below the core.

Figure 1F:
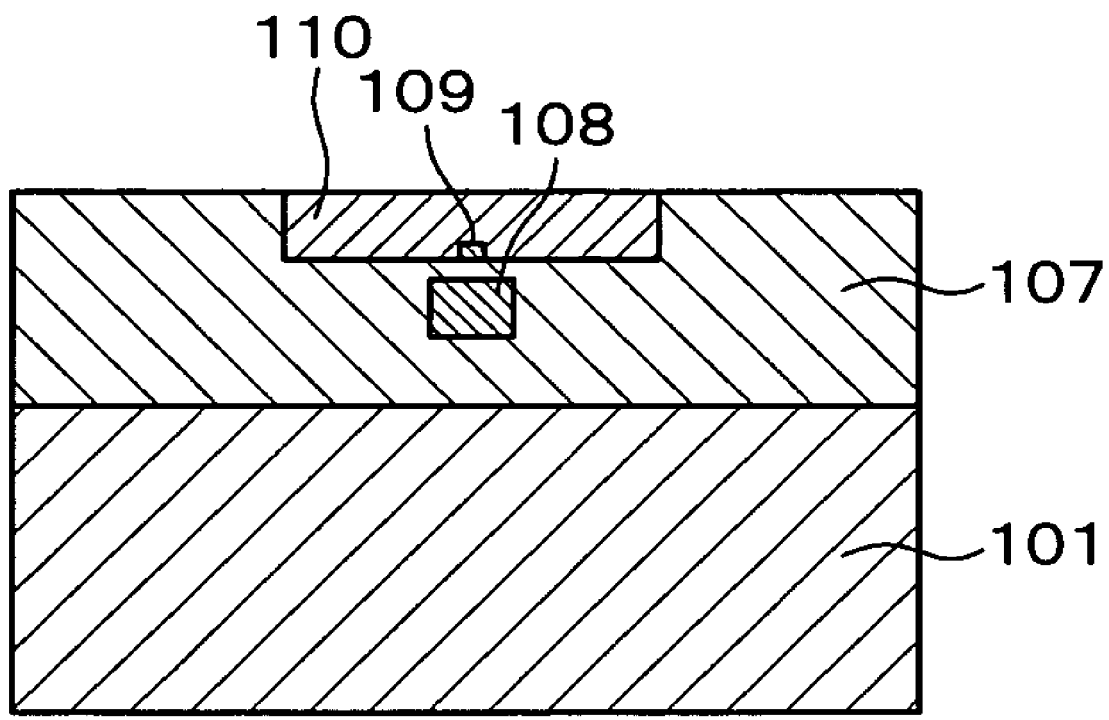
FIG. 1F is a sectional view showing a configuration of an optical switch according to Embodiment 1 of the present invention.

The configuration of FIG. 1F is a configuration where the width of the phase change material portion is narrower than the core width.

Figure 1G:
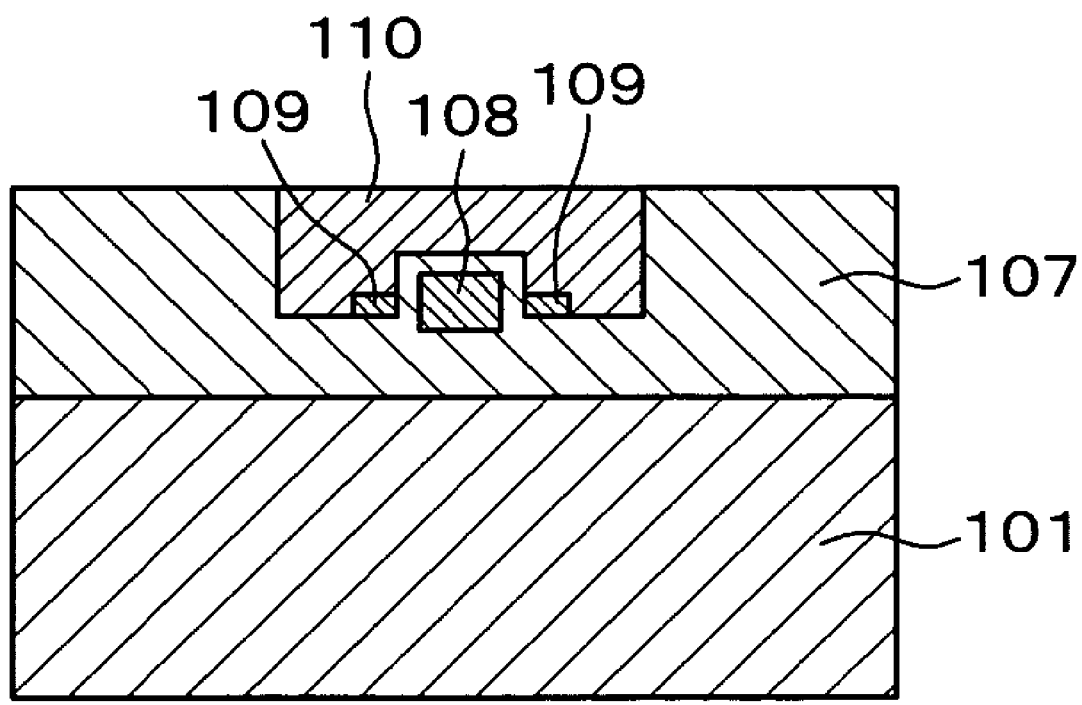
FIG. 1G is a sectional view showing a configuration of an optical switch according to Embodiment 1 of the present invention.

The configuration of FIG. 1G is a configuration where the phase change material portion is arranged only in the vicinity of core sidewalls.

In the configurations of FIG. 1C to FIG. 1E, switching characteristics of small polarization dependence with a slighter difference in operating characteristics between TM and TE waves than that of the configuration of FIG. 1B can be obtained.

In the configurations of FIG. 1F and FIG. 1G, switching characteristics of great polarization dependence with a greater difference in operating characteristics between TM and TE waves can be obtained conversely.

Figure 1H:
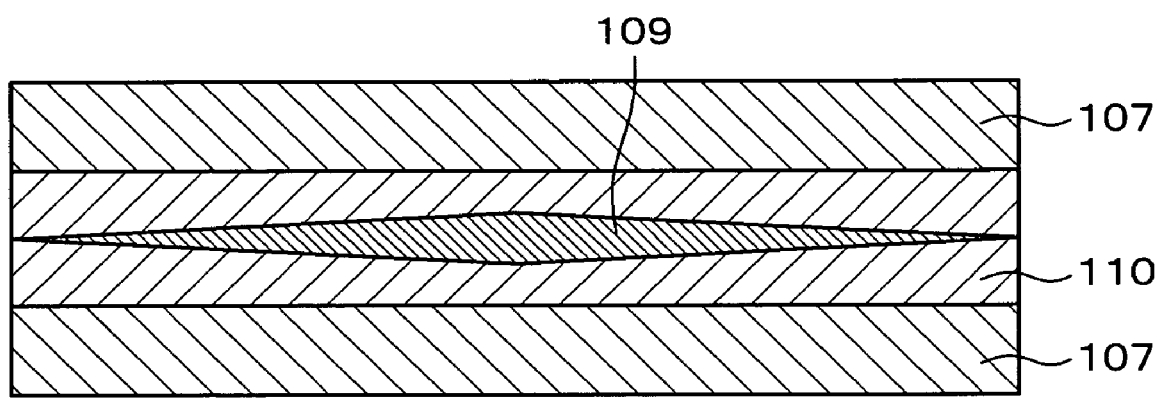
FIG. 1H is a top view showing a configuration of an optical switch according to Embodiment 1 of the present invention.

FIG. 1H and FIG. 1I are top views of FIG. 1B and FIG. 1F. Although FIG. 1H and FIG. 1I show other examples, a mismatch in refractive indices can be reduced by gradually changing the layer width at input and output ends with respect to the phase change material portion 109 in both cases.

Figure 1J:
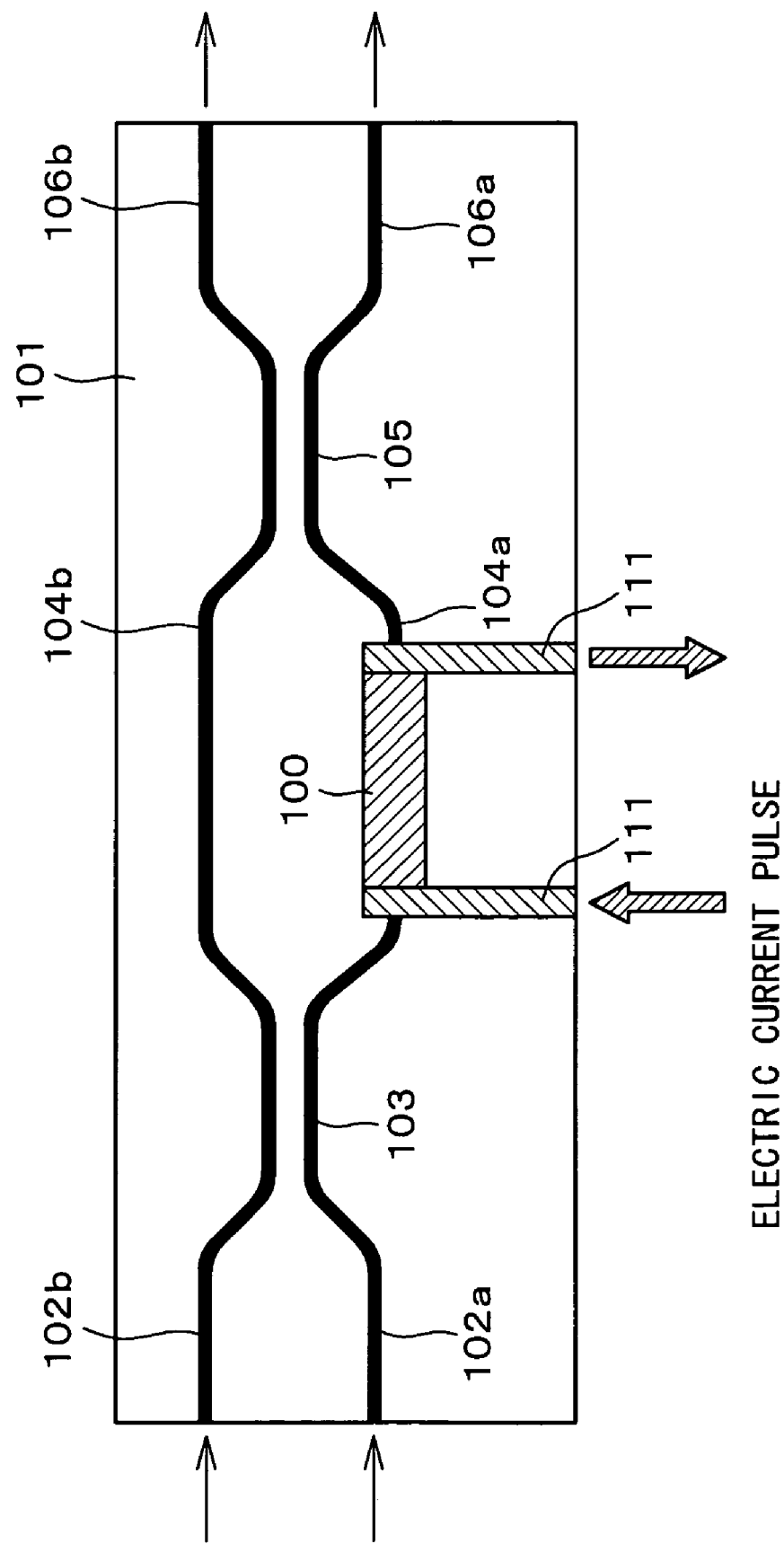
FIG. 1J is a top view showing a configuration of an optical switch according to Embodiment 1 of the present invention.

FIG. 1J is a top view showing another example of Embodiment 1. An optical switch of the present example is driven by controlling not a light pulse but a pulse width and a current value of an electric current pulse that flows through electric wiring 111. When the phase change portion 109 has a length of 50 microns, a width of 20 microns, and a thickness of 0.2 microns, an electric current pulse (for an amorphous to crystal transition) (pulse width: 20 ns, amperage: 2 mA) and an electric current pulse (for a crystal to amorphous transition) (pulse width: 1 ns, pulse intensity: 30 mA) are utilized.

Embodiment 2

FIG. 2A to FIG. 2D are top views showing configurations of an optical switch according to Embodiment 2 of the present invention.

FIG. 2A shows a configuration where phase change material portions are symmetrically arranged on two arm waveguides. Since this is a symmetrical structure, it is easy to equalize the respective arm waveguides in propagation loss, which makes it possible to raise the extinction ratio of the optical switch. In addition, it is also possible to irradiate light onto both arm waveguides so as to cause a push-pull operation by changing one from an amorphous state to a crystal state and the other from a crystal state to an amorphous state.

Figure 2B:
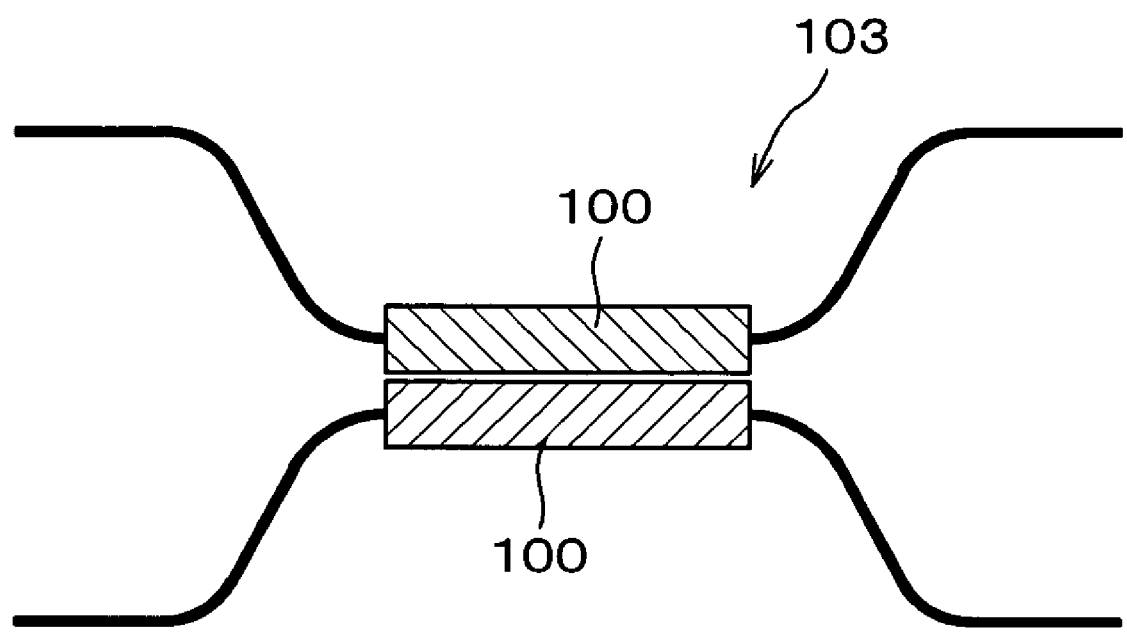
FIG. 2B is a top view showing a configuration of an optical switch according to Embodiment 2 of the present invention.

FIG. 2B is a configuration where phase change material portions are provided at an optical coupling part of a directional coupler. Although fabrication accuracy is required, this is suitable for a reduction in size.

Figure 2C:
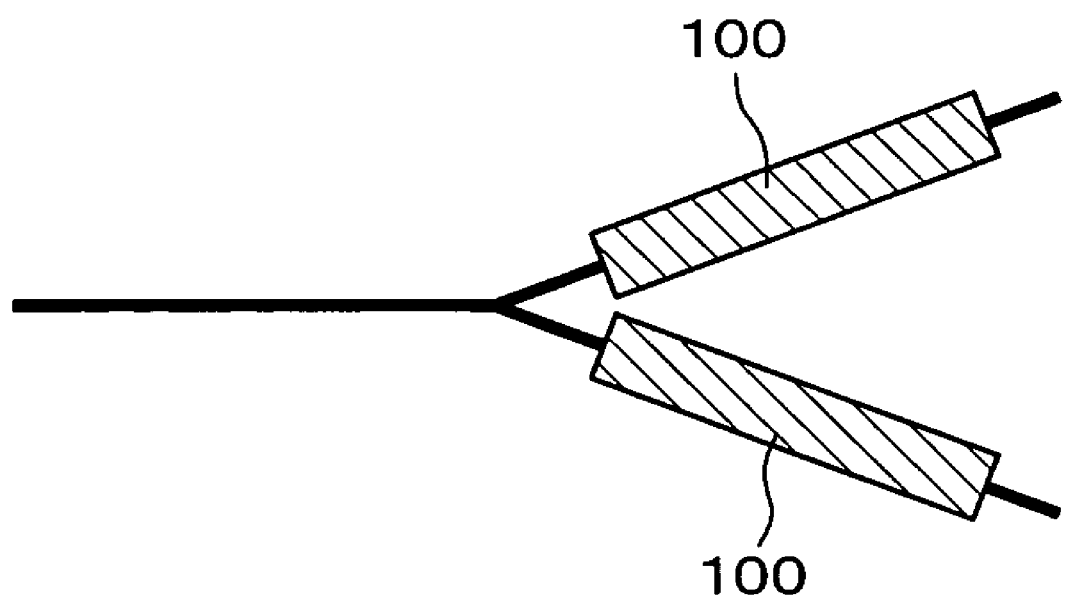
FIG. 2C is a top view showing a configuration of an optical switch according to Embodiment 2 of the present invention.

FIG. 2C is a configuration where phase change material portions are provided at parts of a Y-branch structure. Since the Y-branch switch has so-called digital input/output characteristics, for a switching operation, a change in the refractive index may be large as long as it is equal to or more than a threshold value. Namely, tolerance of a control light pulse to the pulse width and pulse intensity is great. In other switch structures, when a change in the refractive index exceeds an optimal value, since the extinction ratio is deteriorated conversely, tolerance of a control light pulse to the pulse width and pulse intensity is small.

Figure 2D:
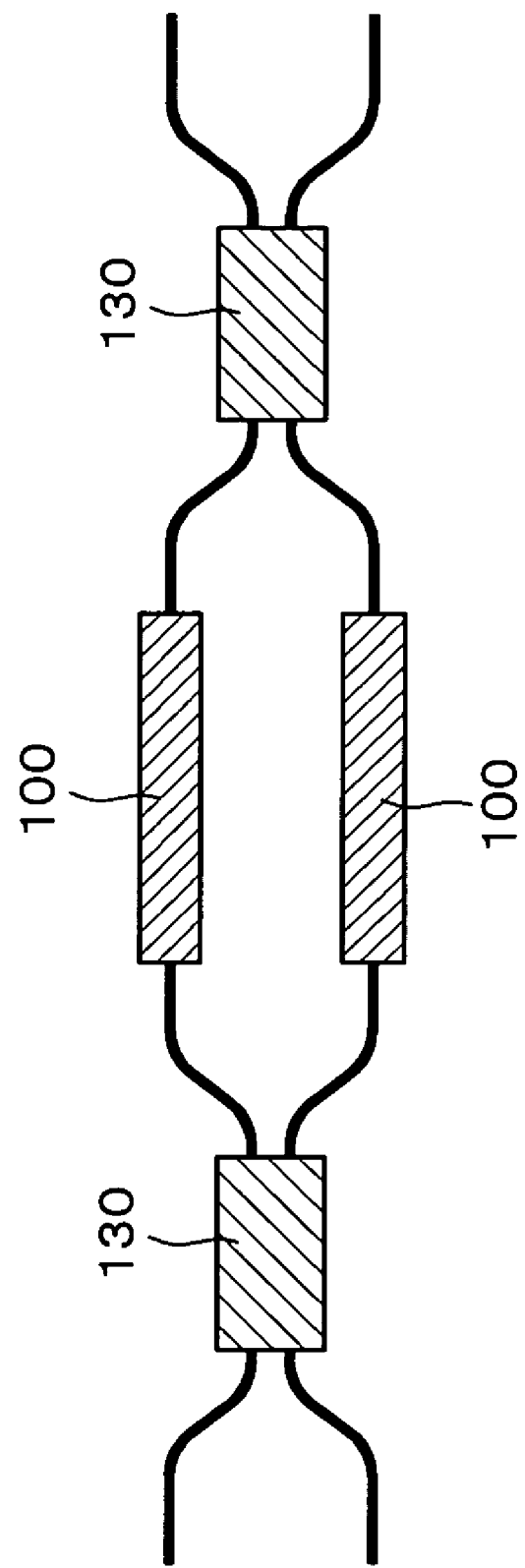
FIG. 2D is a top view showing a configuration of an optical switch according to Embodiment 2 of the present invention.

FIG. 2D is a configuration where multimode interference optical couplers are used in place of directional couplers. By using multimode interference optical couplers 130, an advantage is provided in a smaller size than that with directional couplers and a great tolerance to a fabrication error.

Embodiment 3

FIG. 3 is a sectional view showing a configuration of an optical switch according to Embodiment 3 of the present invention. In the optical switch of Embodiment 3, a phase change material portion 109 is processed into thin lines having roughly a 10 nm to 200 nm width or island-shaped grains having a diameter of 10 nm to 200 nm. Phase change characteristics of the phase change material portion 109 greatly change depending on its grain diameter. By such a miniaturization, phase transition time can be reduced to construct a high-speed switch.

Embodiment 4

Figure 4C:
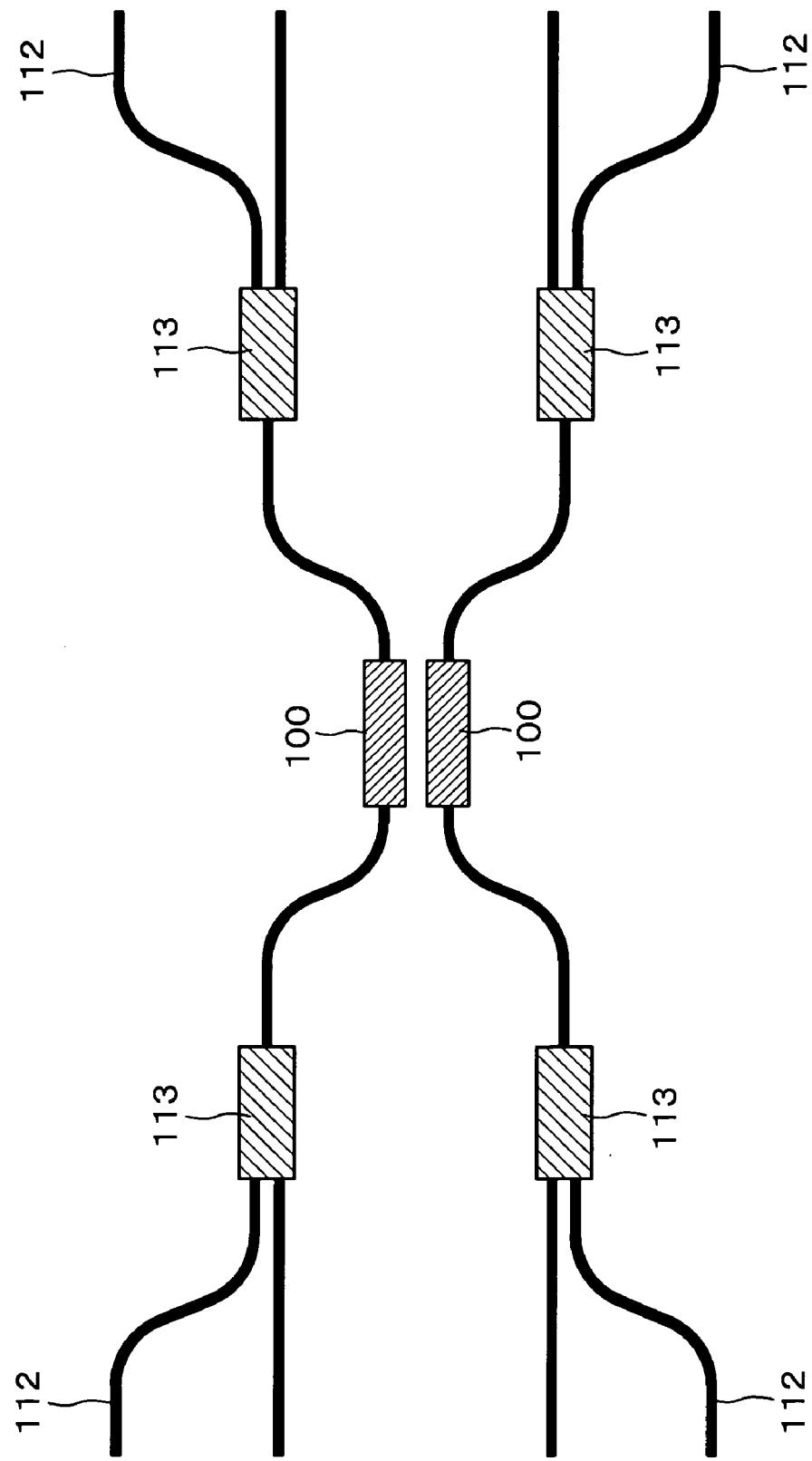
FIG. 4C is a top view showing a configuration of an optical switch according to Embodiment 4 of the present invention.

FIG. 4A to FIG. 4C are top views showing configurations of an optical switch according to Embodiment 4 of the present invention. In the optical switch of Embodiment 4, a control light is not irradiated from the outside of a quartz substrate 101 but there are waveguides 112 that guide a control light and couplers 113 that couple with phase change material portions 100. In the present embodiment, since integration also including the control light guiding/irradiating portion is carried out, this is effective for providing the optical switch as a small-sized device.

Embodiment 5

FIG. 5 is a perspective view showing a configuration of an optical switch according to Embodiment 5 of the present invention. The optical switch of Embodiment 5 includes a planar-laser array 114, a lens array 115, and an optical switch 116. In the present embodiment, a control light is irradiated from the planar-laser array 114 onto the optical switch 116. When the switch scale is increased, a problem arises such that an optical system and waveguides for irradiating a control light onto respective elemental switches are complicated, and intersections are also increased. In the present configuration, since a planar-laser array 114 that allows to arrange light sources at a high density and is capable of generating a light pulse at high speed is utilized, it is possible to construct a large-scale optical switch.

Embodiment 6

FIG. 6A to FIG. 6C are views showing configurations and operations of an optical switch according to Embodiment 6 of the present invention. The optical switch of Embodiment 6 includes 1×2 optical switches 117 and delay waveguides 118. In the present embodiment, N−1 1×2 optical switches 117 are connected in series (N=4 in the present embodiment) to construct a 1:N optical serial-parallel converter or an N:1 optical parallel-serial converter. It is assumed that an N-channel bit-multiplexed signal was made incident into the present 1:N optical serial-parallel converter on the time axis. The distance between adjacent optical switches is set equal to a distance where a light is propagated through a waveguide in a bit-to-bit period of the signal. Therefore, in a certain instance, second to Nth bit light pulses are simultaneously made incident into the first to N−1th optical switches, respectively. The respective switches are driven in line with this timing, and after an elapse of the bit-to-bit period, the switches are returned to their original states. As such, the incident N-channel bit-multiplexed signal is developed in parallel. In addition, delay waveguides 118 are provided so that these pulses are simultaneously outputted from the 1:N serial-parallel converter. For ease in understanding these operations, timing charts are shown in FIG. 6B and FIG. 6C. FIG. 6B shows an N-channel bit-modulated signal on a time axis and a condition where N-channel bit-modulated serial signals on light paths are developed into parallel signals by optical switches. FIG. 6c shows ON and OFF control light pulses on the time axis. As a matter of course, the present converter operates as an N:1 optical parallel-serial converter when parallel light pulses are made incident from an opposite direction. In addition, it is a matter of course that, when phase change optical switches are of an electric drive type, it is possible to drive the phase change optical switches by electric pulses.

Embodiment 7

FIG. 7A and FIG. 7B are views showing a configuration and an operation of an optical switch according to Embodiment 7 of the present invention. The optical switch of Embodiment 7 includes 1×2 optical switches 119, wavelength converters 120, a reset pulse light source 121, and a reading pulse light source 122. In the present embodiment, provided is a parallel bit variable delay/wavelength conversion circuit wherein N−1 1×2 optical switches 119 are connected in parallel, and another reset pulse light source 121 and reading pulse light source 122 are combined. The wavelength converter 120 converts the wavelength of 1550 nm-signal light pulses inputted in parallel to 775 nm that allows writing, and makes the same incident into the 1×2 optical switches 119. By these signal light pulses, the 1×2 optical switches 119 transit from a "0" state to a "1" state. Reading pulses as a control light that is irradiated at an appropriate time are outputted when the 1×2 optical switches 119 are in the "1" state, while in the "0" state (with no incident signal light pulses), these are not outputted. For respective parallel bits, it is possible to regulate reading pulse timing so as to control delay of signal light pulses. Here, signal light pulse information (presence or absence of pulses) is reloaded onto reading pulses. Moreover, it is also possible to utilize reading pulses the same in wavelength as the signal light pulses and it is also possible to utilize reading pulses different in wavelength. In the latter case, not only a delay but also a wavelength conversion is carried out. As a matter of course, light sources having different reading wavelength may be used for each bit. In addition, it is a matter of course that, when the intensity of an incident signal light pulse is sufficiently strong, since switching is carried out by multiphoton absorption in the phase change material portion 109, no wavelength conversion is necessary. FIG. 7B shows a timing chart thereof. A writing pulse, a switch state, a reset pulse, a reading pulse, and an output pulse on time axes are shown. In addition, it is a matter of course that, when optical switches are of an electric drive type, it is possible to drive the phase change optical switches by converting light pulses to electric pulses by use of a photoelectric conversion circuit in place of a wavelength conversion.

Embodiment 8

Figure 8:
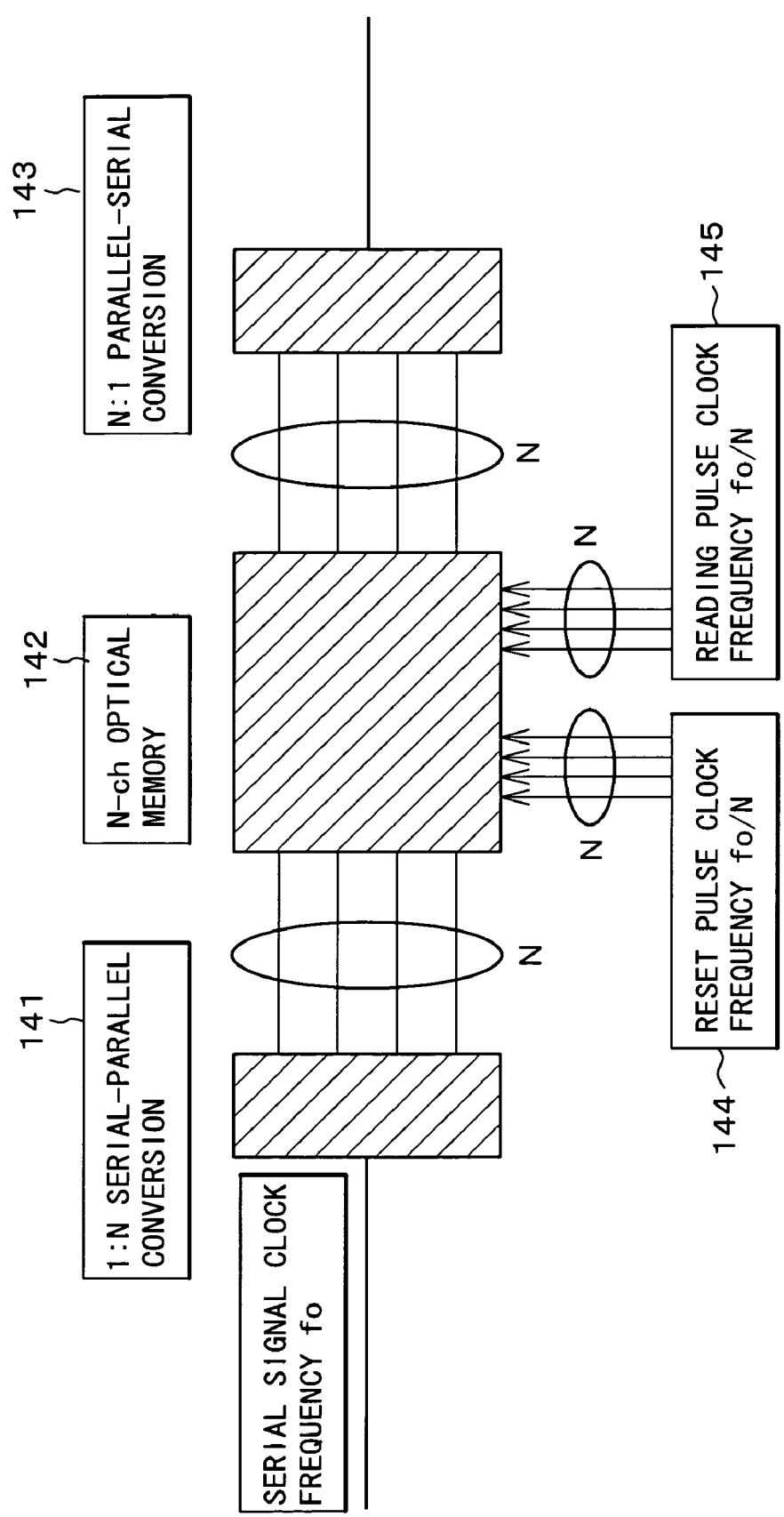
FIG. 8 is a view showing a configuration of an optical switch according to Embodiment 8 of the present invention.

FIG. 8 is a view showing a configuration of an optical switch according to Embodiment 8 of the present invention. The optical switch of Embodiment 8 is an optical time switch constructed by combining Embodiment 6 and Embodiment 8. An N-bit time-division-multiplexed signal is developed at a clock frequency of f0 in parallel by a 1:N serial-parallel converter 141, interchanging between respective channels on a time axis is carried out by an N-channel optical memory 142 of a parallel bit variable delay circuit, and the signals are outputted as a serial signal by an N:1 parallel-serial converter 143.

Embodiment 9

Figure 9:
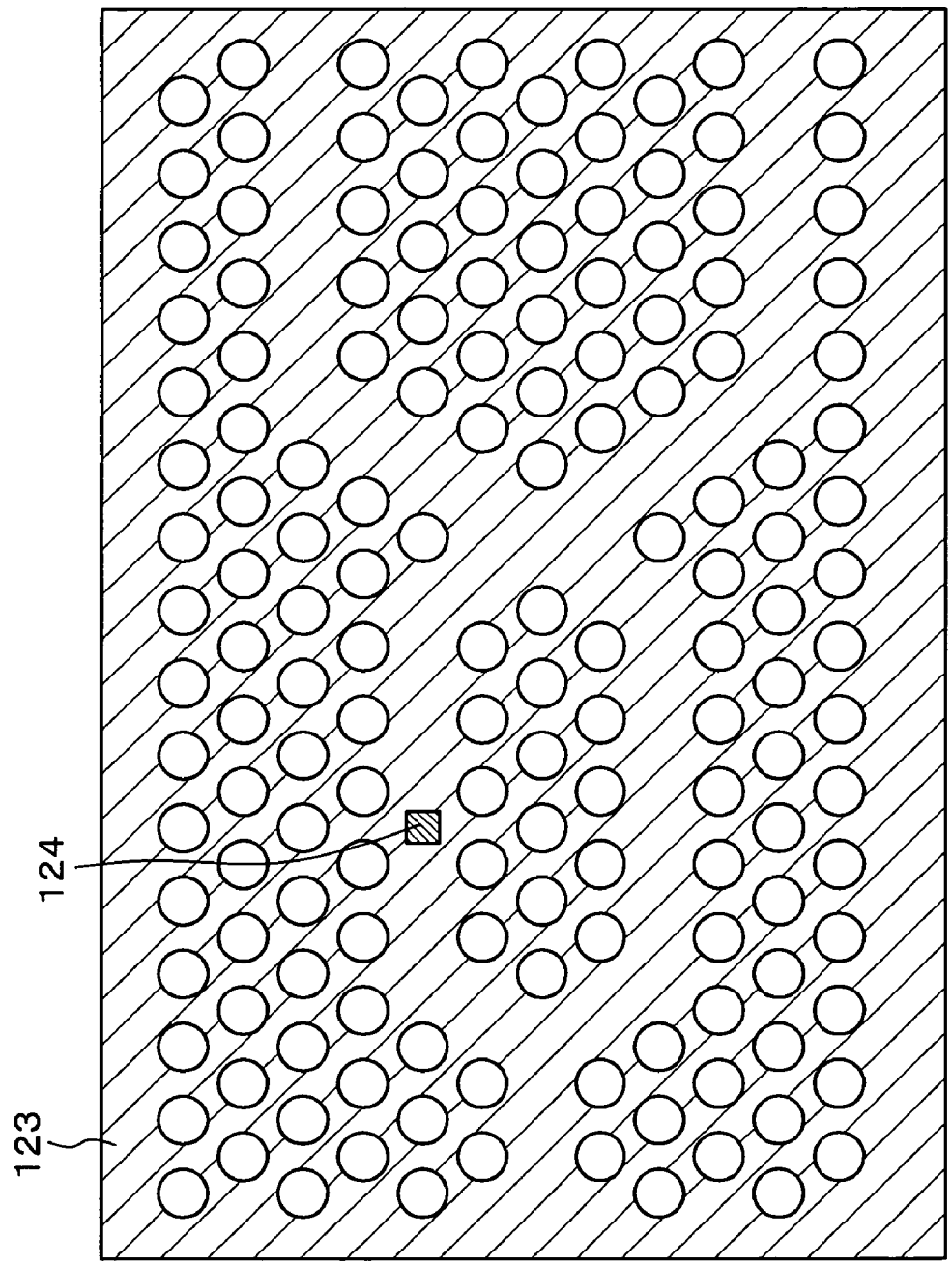
FIG. 9 is a top view showing a configuration of an optical switch according to Embodiment 9 of the present invention.
Figure 10A:
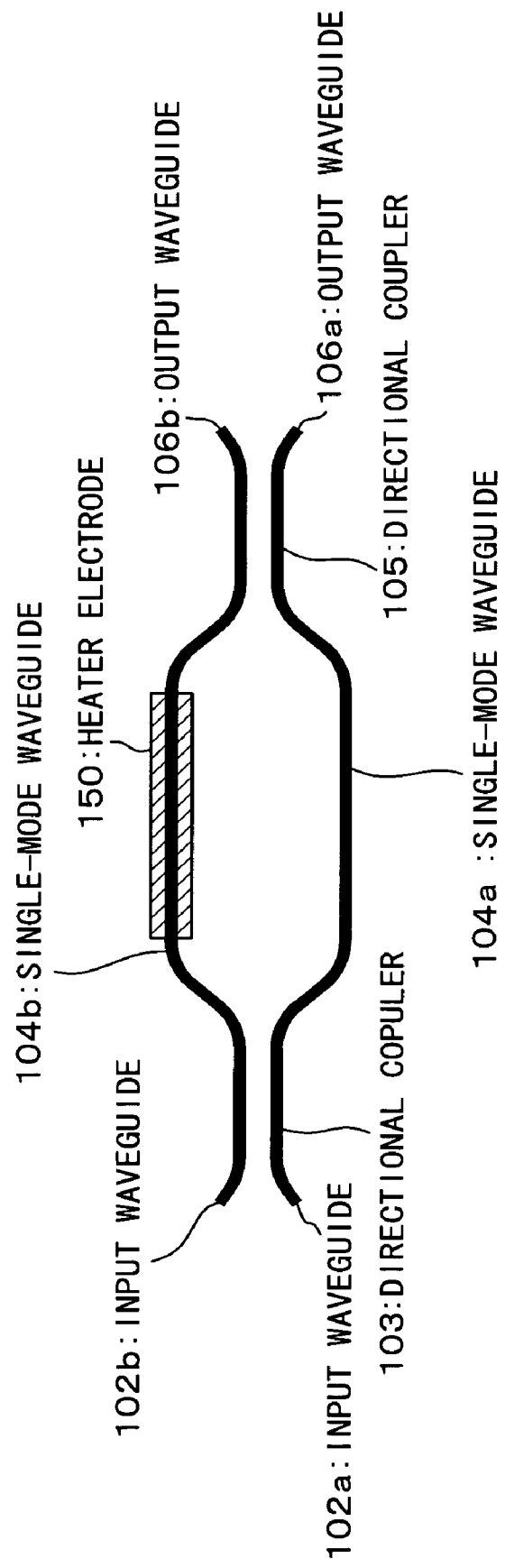
FIG. 10A is a view showing a configuration and operation mechanism of a conventional optical switch.

FIG. 9 is a top view showing a configuration of an optical switch according to Embodiment 9 of the present invention. For the optical switch of Embodiment 9, photonic crystal waveguides are utilized for a reduction in size of the optical switch, and the optical switch includes a two-dimensional slab photonic crystal 123 and a phase change material portion 124. A photonic crystal is a material having a periodic structure where two or more materials (one thereof can be air) different in refractive index have been arranged with spatial symmetry and regularity. Although a photonic crystal does not transmit a light with a wavelength corresponding to a photonic band gap (PBG), this can transmit other wavelengths. Therefore, when a defect is introduced into a photonic crystal, at the defect position, even a light having a PBG wavelength can exist in the photonic crystal. By introducing a line defect into a photonic crystal or introducing continuously arranged point defects by taking advantage of this feature, an optical waveguide using a defect propagation of light can be realized. The two-dimensional slab photonic crystal 123 is constructed by, for example, providing an $SiO_2$ layer on an Si substrate, forming thereon an Si layer, and periodically arranging numerous holes or pillars. The phase change material portion 124 may be deposited on the Si layer or may be deposited after etching the Si layer. The configuration of Embodiment 9 is a Mach-Zehnder interferometric optical switch of a photonic crystal.

However, the present invention is not limited to the examples.

All publications, patents, and patent applications cited in the present specification are herein incorporated by reference in their entirety.

What is claimed is:

1. An optical switch comprising:
   a substrate;
   a cladding formed on said substrate;
   a core formed in said cladding, forming a waveguide with said cladding; and
   a phase change material portion formed in said cladding along said core, having an optical thickness equal to or less than ½ of an operating wavelength, for changing the refractive index of said waveguide by the phase state being controlled by a light irradiation, a voltage application, or an electric current injection.

2. The optical switch as set forth in claim 1, wherein said phase change material portion includes:
a tetrahedral material;
a Ge—Sb—Te-based chalcogenide material;
a Sb—Te-based chalcogenide material; or
a chalcogenide material such as $As_2Se_3$ or $As_2S_3$.

3. The optical switch as set forth in claim 1, wherein a phase change material of said phase change material portion is composed of grains having a diameter of 10 nm to 200 nm or thin lines having a 10 nm to 200 nm width.

4. The optical switch as set forth in claim 1, wherein an optical switch configuration is any of:
a Mach-Zehnder type where a first input waveguide, a first directional coupler, two single-mode arm waveguides, a second directional coupler, and an output waveguide are connected in this order, and said phase change material portion is provided on one or both of said single-mode arm waveguides;
a Mach-Zehnder type where a first input waveguide, a first multimode interference coupler, two single-mode arm waveguides, a second multimode interference coupler, and an output waveguide are connected in this order, and said phase change material portion is provided on one or both of said single-mode arm waveguides;
a Y-branch type where a first input waveguide, Y-branch waveguides, and an output waveguide are connected in this order, and said phase change material portion is provided on one or both of said Y-branch waveguides; and
a directional coupling type where a first input waveguide, a directional coupler, and an output waveguide are connected in this order, and said phase change material portion is provided on one or both of said directional couplers.

5. The optical switch as set forth in claim 1, comprising a second input waveguide and coupler for guiding an optical switch control light to said phase change material portion.

6. The optical switch as set forth in claim 1, comprising a planar-laser array that emits an optical switch control light for controlling said phase change material portion arranged opposite said substrate.

7. An optical switch comprising:
a photonic crystal waveguide; and
a phase change material portion formed along a light path of said photonic crystal waveguide, having an optical thickness equal to or less than ½ of an operating wavelength, for changing the refractive index of said photonic crystal waveguide by the phase state being controlled by a light irradiation, a voltage application, or an electric current injection.

* * * * *